(12) United States Patent
Sugimoto et al.

(10) Patent No.: US 11,938,752 B2
(45) Date of Patent: Mar. 26, 2024

(54) OMNIDIRECTIONAL WHEEL

(71) Applicant: WHILL, Inc., Tokyo (JP)

(72) Inventors: Shuntaro Sugimoto, Tokyo (JP);
Kazuo Bando, Tokyo (JP); Satoshi Nakagawa, Tokyo (JP)

(73) Assignee: WHILL, Inc., Tokyo (JP)

( * ) Notice: Subject to any disclaimer, the term of this patent is extended or adjusted under 35 U.S.C. 154(b) by 0 days.

(21) Appl. No.: 17/774,603

(22) PCT Filed: Oct. 23, 2020

(86) PCT No.: PCT/JP2020/039836
§ 371 (c)(1),
(2) Date: May 5, 2022

(87) PCT Pub. No.: WO2021/090700
PCT Pub. Date: May 14, 2021

(65) Prior Publication Data
US 2022/0396091 A1    Dec. 15, 2022

(30) Foreign Application Priority Data
Nov. 8, 2019    (JP) .................................. 2019-203146

(51) Int. Cl.
*B60B 19/00*    (2006.01)
*B60B 19/12*    (2006.01)

(52) U.S. Cl.
CPC .......... *B60B 19/003* (2013.01); *B60B 19/125* (2013.01)

(58) Field of Classification Search
CPC .......................... B60B 19/003; B60B 19/125
See application file for complete search history.

(56) References Cited

U.S. PATENT DOCUMENTS

| 10,675,912 B1 * | 6/2020 | Liang ................... B60B 19/003 |
| 2020/0039288 A1 | 2/2020 | Hirata et al. |
| 2020/0047548 A1 | 2/2020 | Sugimoto et al. |

FOREIGN PATENT DOCUMENTS

| CN | 203957704 | 7/2014 |
| CN | 2003957704 U | 11/2014 |

(Continued)

OTHER PUBLICATIONS

International Search Report for International Application No. PCT/JP2020/039836, dated Dec. 8, 2020, 5 pages.

(Continued)

*Primary Examiner* — Jason R Bellinger
(74) *Attorney, Agent, or Firm* — BainwoodHuang

(57) ABSTRACT

An omnidirectional wheel whose outer circumference surface is formed by pluralities of rollers, and includes a rotating part that rotates around a rotation axis. A plurality of supports are arranged in a circumferential direction of the rotating part and each mounted on the rotating part. The rollers include a plurality of first rollers and a plurality of second rollers. Each support has a first arm supporting one end side of a corresponding first roller of the plurality of first rollers, and a second arm supporting the other end side of the corresponding first roller. A corresponding second roller of the plurality of second rollers is supported by the first arm of one of two supports that are adjacent to each other in the circumferential direction and the second arm of the other one of the two supports.

17 Claims, 21 Drawing Sheets

(56) References Cited

FOREIGN PATENT DOCUMENTS

| | | |
|---|---|---|
| CN | 108773243 | 11/2018 |
| EP | 3611032 A1 | 2/2020 |
| EP | 3611085 A1 | 2/2020 |
| JP | 2011191704 A | 7/2001 |
| JP | 2001191704 | 7/2011 |
| JP | 2017128327 A | 7/2017 |
| JP | 2018176990 A | 11/2018 |
| WO | 2018190388 A1 | 10/2018 |
| WO | 2018190389 A1 | 10/2018 |
| WO | 2019107227 A1 | 6/2019 |

OTHER PUBLICATIONS

German Office Action with English Translation from German Application No. 112020004834.9, Office Action dated Nov. 20, 2023.

* cited by examiner

OMNIDIRECTIONAL WHEEL

CROSS-REFERENCE TO RELATED APPLICATION(S)

This application is based upon and claims the benefit of priority from Japanese Patent Application No. 2019-203146 filed on Nov. 8, 2019, the entire contents of which are incorporated herein by reference.

TECHNICAL FIELD

The present invention relates to an omnidirectional wheel.

BACKGROUND ART

As such an omnidirectional wheel, there is known an omnidirectional wheel that includes: an axle shaft; a disc-shaped member rotatably supported on the axle shaft; a plurality of support members mounted on an outer circumference part of the disc-shaped member at intervals in the circumferential direction; small-diameter rollers rotatably supported by the respective support members; and a plurality of large-diameter rollers each supported by two support members that are adjacent to each other in the circumferential direction. Such an omnidirectional wheel is disclosed in, for example, PTL 1.

CITATION LIST

Patent Literature

{PTL 1}
Publication of Japanese Patent No. 3421290

SUMMARY OF INVENTION

A first aspect of the present invention is an omnidirectional wheel whose outer circumference surface is formed with a plurality of rollers and which rotates around a rotation axis of an axle, the omnidirectional wheel comprising: a rotating part that rotates around the rotational axis of the axle; and a plurality of supports which is arranged in a circumferential direction of the rotating part and each of which is mounted on the rotating part to support the plurality of rollers on the rotating part, wherein the plurality of rollers includes a plurality of first rollers and a plurality of second rollers having a different outside diameter from the first rollers, the first rollers and the second rollers alternate with each other in the circumferential direction, each of the supports has a first arm member that supports one end side in an axial direction of a corresponding first roller that is corresponding one of the plurality of first rollers, and a second arm member that supports the other end side in the axial direction of the corresponding first roller, and a corresponding second roller that is corresponding one of the plurality of second rollers is supported by the first arm member of one of two supports that are adjacent to each other in the circumferential direction and the second arm member of the other one of the two supports.

A second aspect of the present invention is an omnidirectional wheel whose outer circumference surface is formed with a plurality of rollers and which rotates around a rotation axis of the axle, the omnidirectional wheel comprising: a rotating part that rotates around the rotation axis of the axle; and a plurality of supports which is arranged in a circumferential direction of the rotating part and each of which is mounted on the rotating part to support the plurality of rollers on the rotating part, wherein the plurality of rollers includes a plurality of small-diameter rollers and a plurality of large-diameter rollers having a larger outside diameter than the small-diameter rollers, the small-diameter rollers and the large-diameter rollers alternate with each other in the circumferential direction, each of the supports has a first arm that supports one end side in an axial direction of a corresponding small-diameter roller that is corresponding one of the plurality of small-diameter rollers, and a second arm that supports the other end side in the axial direction of the corresponding small-diameter roller, a corresponding large-diameter roller that is corresponding one of the plurality of large-diameter rollers is supported by the first arm of one of two supports that are adjacent to each other in the circumferential direction and the second arm of the other one of the two supports, in the first arm, a large-diameter-roller support part that supports the corresponding large-diameter roller is disposed on an inner side in a radial direction of the rotating part relative to a small-diameter-roller support part that supports one end side in the axial direction of the small-diameter roller, the first arm has a connecting part that connects the large-diameter-roller support part and the small-diameter-roller support part to each other, and when seen from an extension direction of the rotation axis of the axle, the connecting part extends mainly in a direction of a rotational axis of the corresponding large-diameter roller.

A third aspect of the present invention is an omnidirectional wheel whose outer circumference surface is formed with a plurality of rollers and which rotates around a rotation axis of the axle, the omnidirectional wheel comprising: a rotating part that rotates around the rotation axis of the axle; and a plurality of supports which is arranged in a circumferential direction of the rotating part and each of which is mounted on the rotating part to support the plurality of rollers on the rotating part, wherein the plurality of rollers includes a plurality of small-diameter rollers and a plurality of large-diameter rollers having a larger outside diameter than the small-diameter rollers, the small-diameter rollers and the large-diameter rollers alternate with each other in the circumferential direction, each of the supports has a first arm that supports one end side in an axial direction of a corresponding small-diameter roller that is corresponding one of the plurality of small-diameter rollers, and a second arm that supports the other end side in the axial direction of the corresponding small-diameter roller, a corresponding large-diameter roller that is corresponding one of the plurality of large-diameter rollers is supported by the first arm of one of two supports that are adjacent to each other in the circumferential direction and the second arm of the other one of the two supports, in the first arm, a large-diameter-roller support part that supports the corresponding large-diameter roller is disposed on an inner side in a radial direction of the rotating part relative to a small-diameter-roller support part that supports one end side in the axial direction of the corresponding small-diameter roller, the first arm has a base-end-side part that extends mainly in the axial direction of the corresponding small-diameter roller, the base-end-side part connects a fixed part to be fixed to the rotating part and the large-diameter-roller support part to each other, a part of an inner surface of the base-end-side part in the radial direction and an inner circumference surface of the corresponding large-diameter roller face each other, a center portion, in a wheel width direction, of the part of the inner surface bulges toward the inner side in the radial direction, and a distance between the part of the inner surface and the inner circumference surface of the corresponding large-diameter roller is not larger than 2 mm.

DESCRIPTION OF EMBODIMENTS

An omnidirectional wheel 1 according to a first embodiment of the present invention will be described below with reference to the figures.

An outer circumference surface of an omnidirectional wheel is formed by a plurality of rollers. This makes it difficult to achieve a high level of compatibility between firmly supporting each roller and reducing the weight of the omnidirectional wheel. For example, when an omnidirectional wheel is used in an electric mobility vehicle that one person rides by sitting on the sheet, each roller may be subjected to a force of 300 N or greater in some cases and may even be subjected to a force of 500 N or greater in other cases. In addition, such an electric mobility vehicle is used almost daily over a long period of time. Therefore, the poor support members would undergo a change in their positions of supporting the rollers, or deform or break of the support members, thereby significantly reducing the performance of the omnidirectional wheel.

In view of this situation, there is a demand for an omnidirectional wheel that can achieve a high level of compatibility between increasing the force that each roller can bear and reducing the weight of the wheel.

Figure 4:
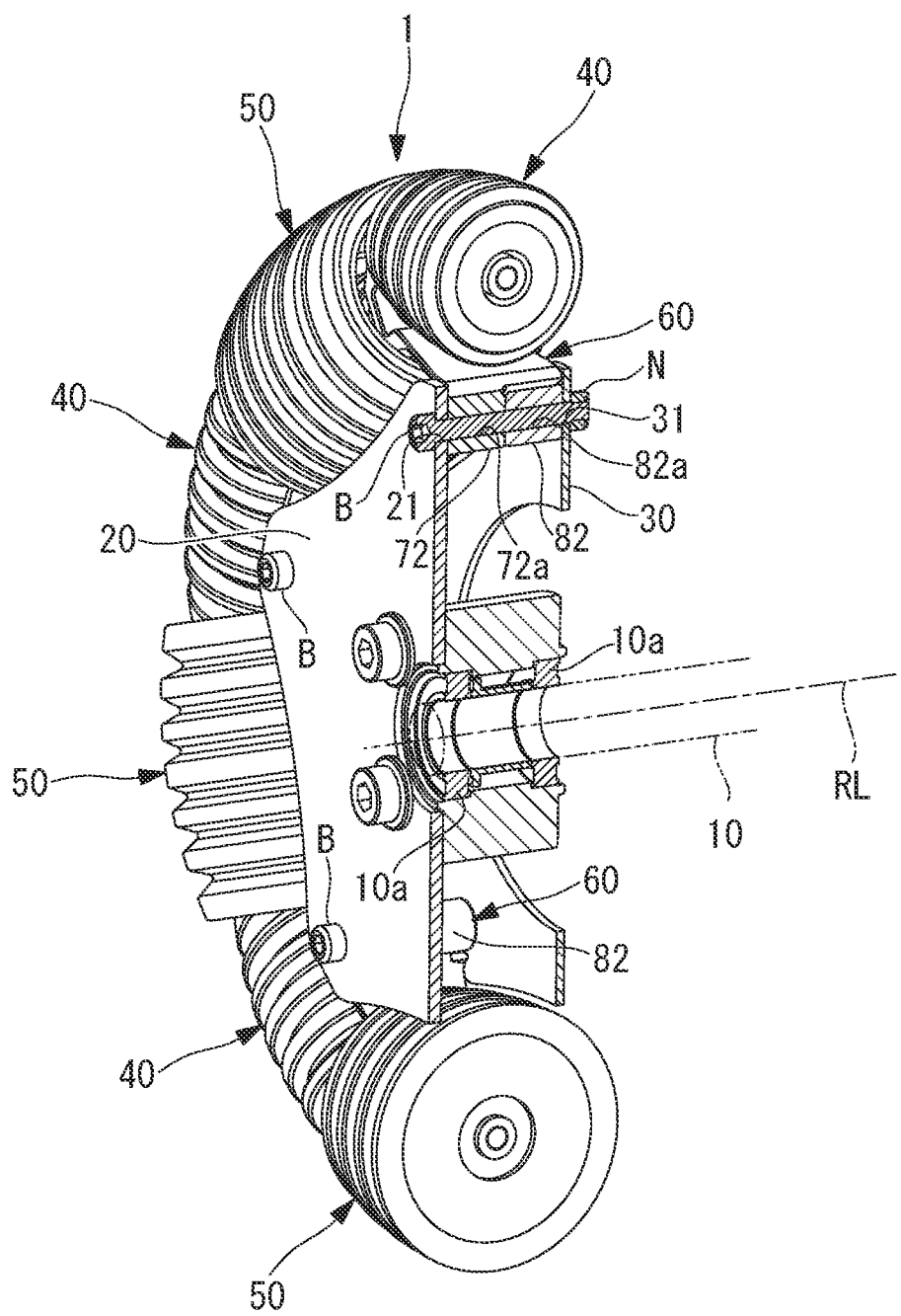
FIG. 4 is a partially sectional perspective view of the omnidirectional wheel according to the first embodiment.
Figure 6:
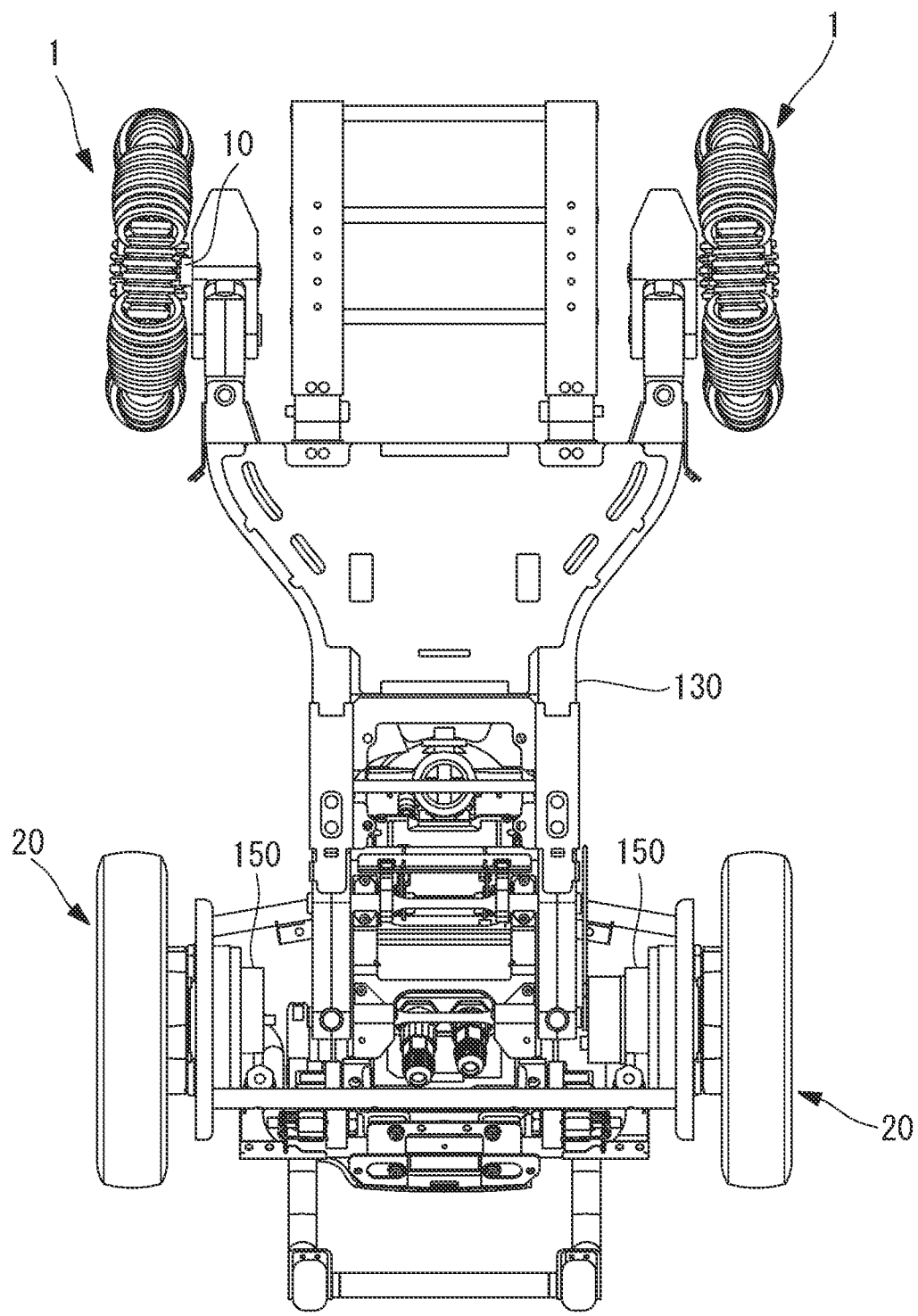
FIG. 6 is a schematic bottom view of the electric mobility vehicle in which the omnidirectional wheel according to the first embodiment is used.

As shown in FIG. 4 and FIG. 6, this omnidirectional wheel 1 has a pair of hub members 20, 30 that is supported on an axle 10 through a pair of bearings 10a which are arranged in a width direction. Thus, the hub members 20, 30 function as rotating parts that rotate around a rotational axis RL.

Figure 1:
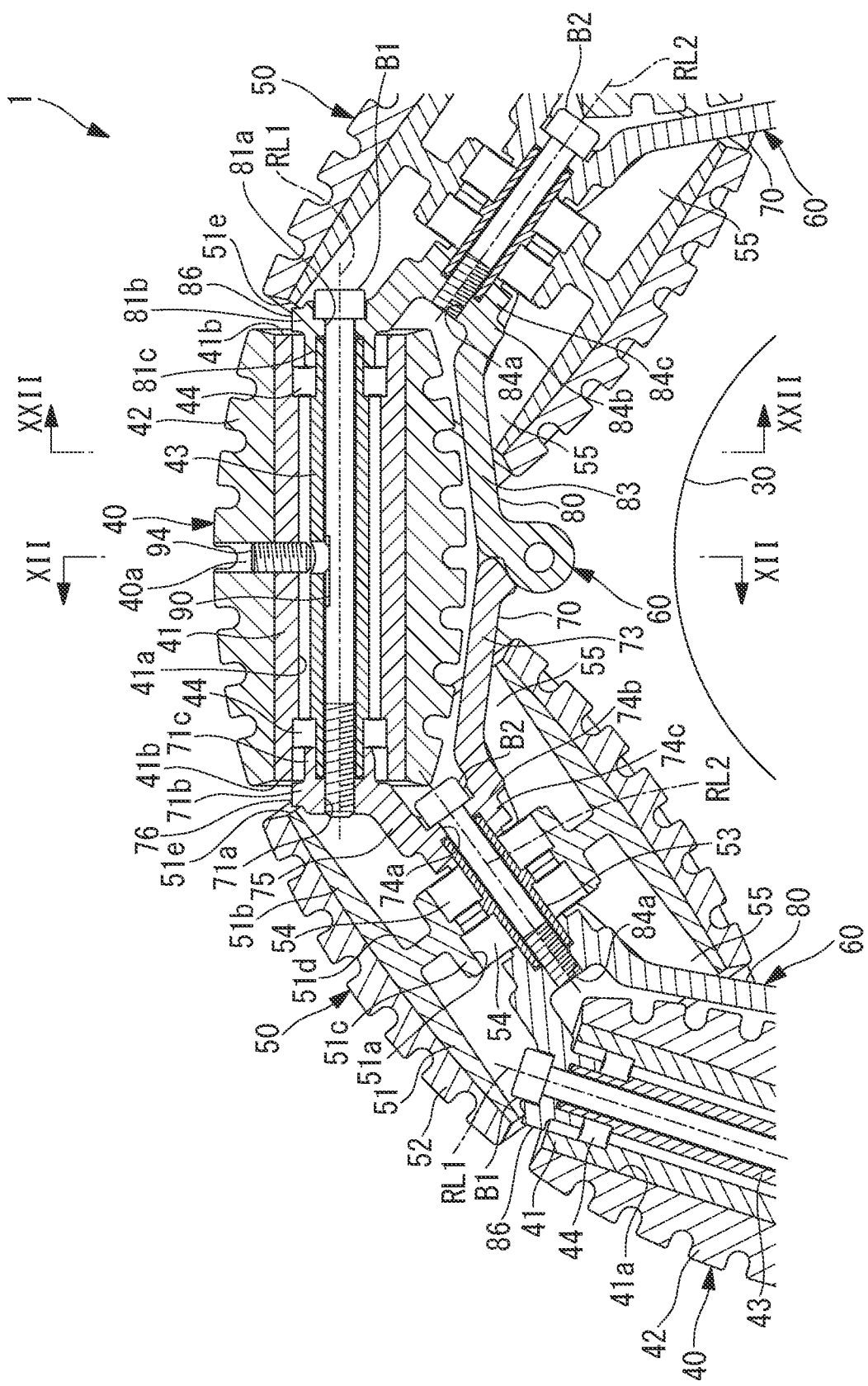
FIG. 1 is a sectional view of an omnidirectional wheel according to a first embodiment of the present invention.
Figure 2:
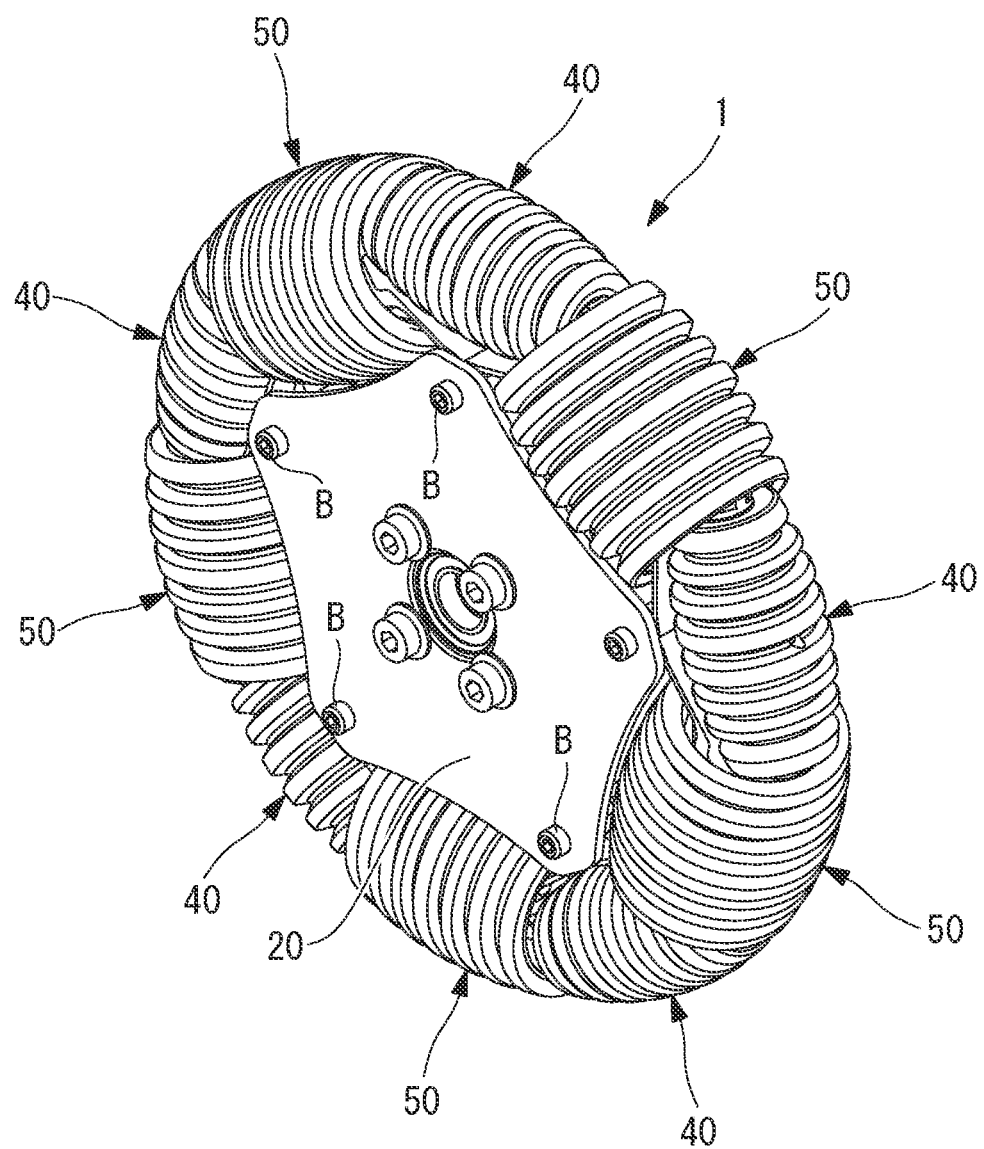
FIG. 2 is a perspective view of the omnidirectional wheel according to the first embodiment.

As shown in FIG. 1, FIG. 2, FIG. 4, etc., an outer circumference surface of the omnidirectional wheel 1 is formed by a plurality of small-diameter rollers (first rollers) 40 and a plurality of large-diameter rollers (second rollers) 50, and the pluralities of rollers 40, 50 are supported by a plurality of supports 60. The large-diameter roller 50 has a larger outside diameter than the small-diameter roller 40, and the plurality of large-diameter rollers 50 and the plurality of small-diameter rollers 40 alternate with each other in a circumferential direction of the hub members 20, 30. The plurality of supports 60 is each mounted on the hub members 20, 30 by bolts (fixing members) B.

In this embodiment, the hub members 20, 30 are formed by punching a metal plate-shaped member. Instead of the hub members 20, 30, a disc-shaped block made of aluminum etc. may be used. In this case, this block functions as a rotating part that rotates around the rotational axis RL, and each of the plurality of supports 60 is mounted on an outer circumference side of the block by the bolt (fixing member) B. Optionally, instead of bolts, rivets (fixing members) may be used, or shafts (fixing members) fixed on the hub members 20, 30 by welding may be used. Other commonly known fixing members may also be used.

As shown in FIG. 1, each small-diameter roller 40 has a substantially cylindrical core member 41, an outer circumference member 42 bonded to an outer circumference surface of the core member 41, and a shaft 43 disposed inside a hole 41a formed in the core member 41. The hole 41a extends in an axial direction of the small-diameter roller 40. The core member 41 may be made of metal, such as aluminum or iron, or may be made of plastic. In this embodiment, the outer circumference member 42 is made of a material having rubber-like elasticity, such as silicone, and is in one example bonded to the outer circumference surface of the core member 41 by vulcanization.

The shaft 43 is made of metal, such as iron or aluminum. The core member 41 is supported on the shaft 43 through bearings 44, so that the core member 41 can rotate around a rotational axis RL1 relative to the shaft 43. An inner circumference surface of the hole 41a of the core member 41 has steps against which the bearings 44 abut, and an outer circumference surface of the shaft 43 also has steps against which the bearings 44 abut. It is also possible to adopt a structure in which a sleeve is disposed on the outer circumference surface of the shaft 43 and the bearings 44 abut against this sleeve.

As shown in FIG. 1, each large-diameter roller 50 has a core member 51 having a substantially cylindrical outer circumference part 51*b*, an outer circumference member 52 bonded to an outer circumference surface of the outer circumference part 51*b*, and a shaft 53 disposed inside a hole 51*a* formed in the core member 51. The hole 51*a* extends in an axial direction of the large-diameter roller 50. The core member 51 may be made of metal, such as aluminum or iron, or may be made of plastic. In this embodiment, the outer circumference member 52 is made of a material having rubber-like elasticity, such as silicone, and is in one example bonded to the outer circumference surface of the outer circumference part 51*b* of the core member 51 by vulcanization.

In this embodiment, the core member 51 has the outer circumference part 51*b*, an inner circumference part 51*c* disposed on an inner side in a radial direction of the outer circumference part 51*b*, and an intermediate part 51*d* connecting the outer circumference part 51*b* and the inner circumference part 51*c* to each other. The intermediate part 51*d* extends in a radial direction of the large-diameter roller 50. An inner circumference surface of the outer circumference part 51*b* is provided with a plurality of ribs (not shown). Each rib leads to the intermediate part 51*d* and/or the inner circumference part 51*c*. The hole 51*a* is formed in the inner circumference part 51*c*.

The shaft 53 is made of metal, such as iron or aluminum. The core member 51 is supported by the shaft 53 through bearings 54, so that the core member 51 can rotate around a rotational axis RL2 relative to the shaft 53. An inner circumference surface of the hole 51*a* of the core member 51 has steps against which the bearings 54 abut, and an outer circumference surface of the shaft 53 also has steps against which the bearings 54 abut. It is also possible to adopt a structure in which a sleeve is disposed on the outer circumference surface of the shaft 53, and the bearings 54 abut against this sleeve.

As shown in FIG. 1 etc., each support 60 has a first arm member 70 that supports one end side in an axial direction of a corresponding small-diameter roller 40 that is corresponding one of the plurality of small-diameter rollers 40, and a second arm member 80 that supports the other end side in the axial direction of the corresponding small-diameter roller 40. In this embodiment, the first arm member 70 supports one end side in the axial direction of the shaft 43 of the corresponding small-diameter roller (corresponding first roller) 40, and the second arm member 80 supports the other end side in the axial direction of the shaft 43 of the corresponding small-diameter roller 40.

As shown in FIG. 1 etc., a corresponding large-diameter roller (corresponding second roller) 50 that is corresponding one of the plurality of large-diameter rollers 50 is supported by the first arm member 70 of one of two supports 60 that are adjacent to each other in the circumferential direction of the hub members 20, 30 and the second arm member 80 of the other one of the two supports 60. In this embodiment, the second arm member 80 supports one end side in the axial direction of the shaft 53 of the corresponding large-diameter roller 50, and the first arm member 70 supports the other end side in the axial direction of the shaft 53 of the corresponding large-diameter roller 50.

In some cases, the small-diameter roller 40 is not provided with the shaft 43. In this case, the bearing 44 on one end side in the axial direction of the corresponding small-diameter roller 40 may be supported by the first arm member 70, and the bearing 44 on the other end side in the axial direction of the corresponding small-diameter roller 40 may be supported by the second arm member 80.

In some cases, the large-diameter roller 50 is not provided with the shaft 53. In this case, the bearing 54 on one end side in the axial direction of the corresponding large-diameter roller 50 may be supported by the second arm member 80, and the bearing 54 on the other end side in the axial direction of the corresponding large-diameter roller 50 may be supported by the first arm member 70.

The arm members 70, 80 are made of metal, such as aluminum, and formed by performing casting. The arm members 70, 80 may be formed by sintering of metal powder. The arm members 70, 80 may be formed by metal plates, such as iron plates, and may be formed by performing pressing. The arm members 70, 80 may be made of metal, plastic, or both plastic and metal. The arm members 70, 80 may be made of metal, such as aluminum or iron, and formed by casting.

Figure 9:
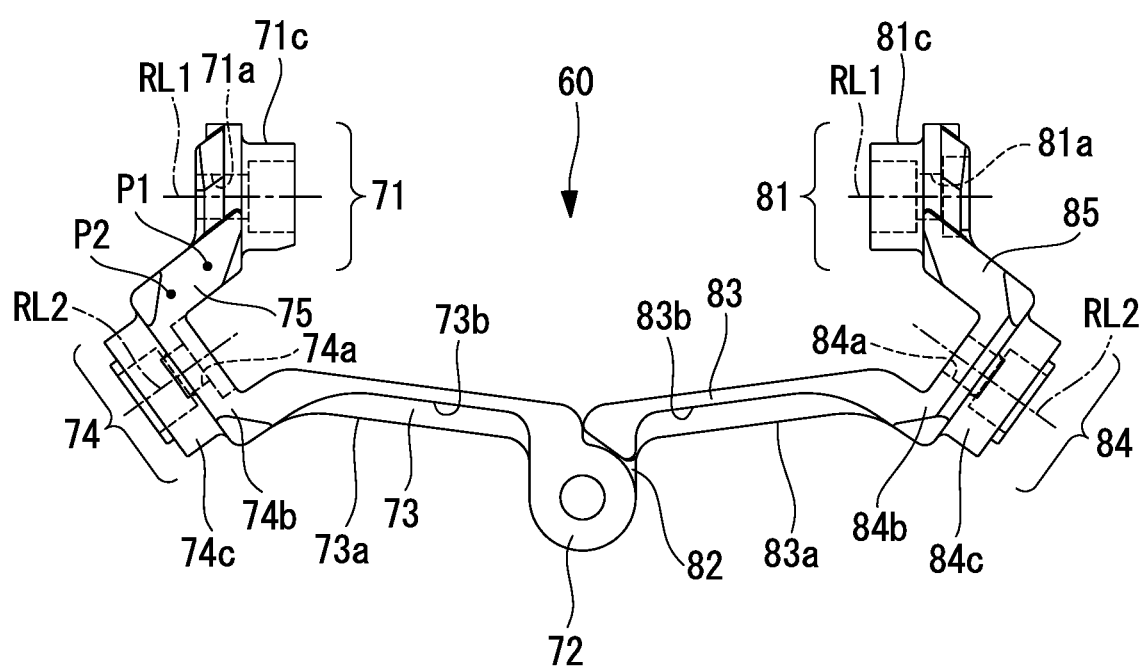
FIG. 9 is a front view of the first arm member and a second arm member used in the omnidirectional wheel according to the first embodiment.
Figure 10:
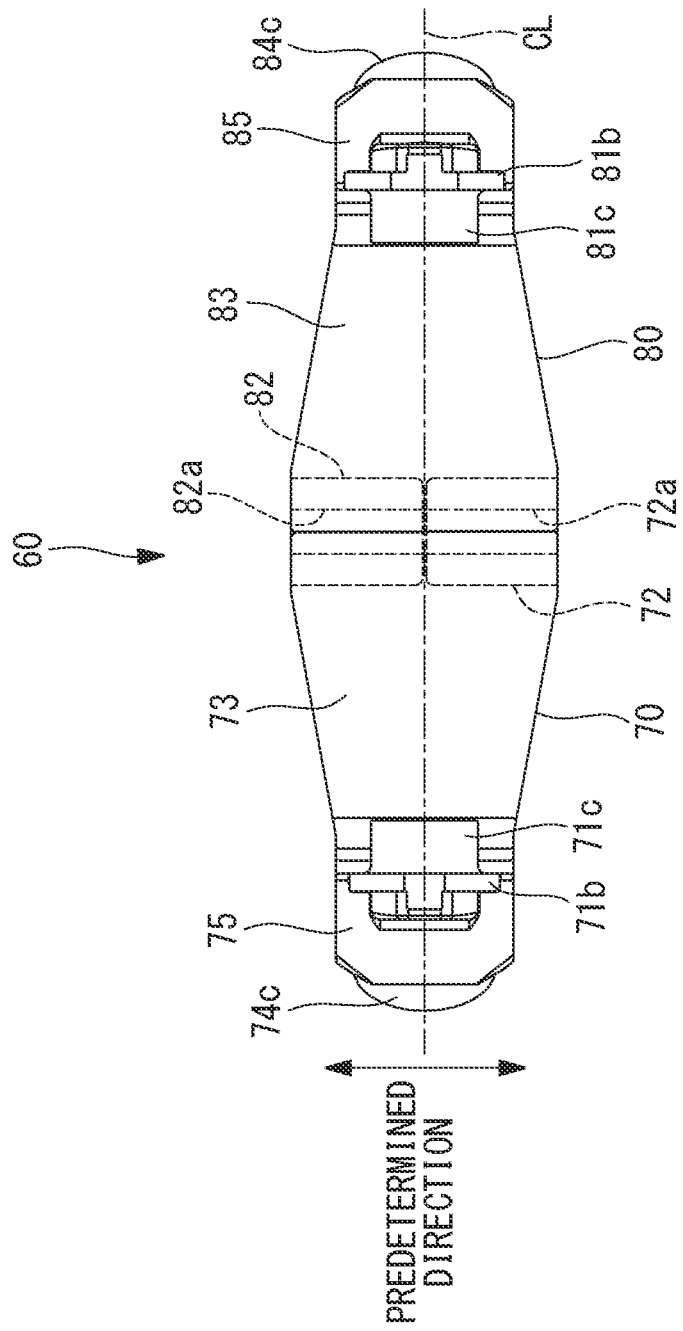
FIG. 10 is a plan view of the first arm member and the second arm member used in the omnidirectional wheel according to the first embodiment.

As shown in FIG. 9, a small-diameter-roller support part 71 that supports one end side of the corresponding small-diameter roller 40 is provided on one end side of the first arm member 70, and a first fixed part 72 that is fixed to the hub members 20, 30 is provided on the other end side of the first arm member 70.

As shown in FIG. 7 to FIG. 10, the first arm member 70 further has a base-end-side part 73 that extends from the first fixed part 72 and mainly in the axial direction of the corresponding small-diameter roller 40, a large-diameter-roller support part 74 that supports the large-diameter roller 50, and a connecting part 75 that connects the large-diameter-roller support part 74 and the small-diameter-roller support part 71 to each other.

The small-diameter-roller support part 71 is provided with a hole 71*a* into which a small-diameter-roller bolt (fixing member) B1, which is described later, is screwed, and the large-diameter-roller support part 74 is provided with a hole 74*a* through which a large-diameter-roller bolt (fixing member) B2, which is described later, passes.

In this embodiment, a plane CL including a centerline of the hole 71*a* and a centerline of the hole 74*a* is the center of the first arm member 70 in a predetermined direction along the rotational axis RL. The first fixed part 72 is disposed not at the very center position relative to that center but at a position offset in the predetermined direction from that center (see FIG. 10). In this embodiment, the position of an end of the first fixed part 72 in the predetermined direction coincides with the position of the plane CL.

The center of the base-end-side part 73 in a width direction may be the center of the first arm member 70 in the predetermined direction along the rotational axis RL.

In this embodiment, the base-end-side part 73 has a substantially plate-like shape and the position of the center of the base-end-side part 73 in the predetermined direction also is the position of the centerline CL. In this embodiment, at least one of a thickness dimension and a width dimension of the base-end-side part 73 decreases gradually toward the one end side of the first arm member 70.

A distal end portion of the base-end-side part 73 bends toward a direction along the rotational axis RL2 of the corresponding large-diameter roller 50, and the large-diameter-roller support part 74 is provided at a distal end of the base-end-side part 73. In this embodiment, the large-diameter-roller support part 74 has a base portion 74*b* that extends from the distal end of the base-end-side part 73 toward an outer side in the radial direction of the hub members 20, 30, and a cylindrical portion 74c that extends from the base portion 74b or near the base portion 74b in a direction along the rotational axis RL2 of the corresponding large-diameter roller 50. The cylindrical portion 74c protrudes from the base portion 74b in a direction away from the first fixed part 72. In this embodiment, the radial direction of the hub members 20, 30 and the radial direction of the omnidirectional wheel 1 coincide with each other.

The inside diameter of the cylindrical portion 74c is slightly larger than the outside diameter of the other end side in the axial direction of the shaft 53 of the large-diameter roller 50. Or the inside diameter of the cylindrical portion 74c is equal to the outside diameter of the other end side in the axial direction of the shaft 53.

When the other end side in the axial direction of the shaft 53 of the corresponding large-diameter roller 50 is inserted into the cylindrical portion 74c, a distal end surface of the cylindrical portion 74c is pressed against an inner ring of the bearing 54, and thereby the inner ring of the bearing 54 is pressed against the step on the other end side of the shaft 53 of the corresponding large-diameter roller 50.

In some cases, the large-diameter-roller support part 74 does not have the cylindrical portion 74c. In this case, the base portion 74b is provided with a counterbore and an end portion of the shaft 53 is fitted into this counterbore. In some cases, the large-diameter-roller support part 74 has other structure that can support the other end side of the corresponding large-diameter roller 50.

A structure may be adopted in which an inner circumference surface of the shaft 53 of the large-diameter roller 50 fits on an outer circumference surface of the cylindrical portion 74c of the large-diameter-roller support part 74. In this case, the inner ring of the bearing 54 fits on the outer circumference surface of the cylindrical portion 74c. Or the inner ring of the bearing 54 fits on the outer circumference surface of the shaft 53. Here, an end surface of the shaft 53 is pressed against the inner ring of the bearing 54 in the axial direction and an outer ring of the bearing 54 fits on an inner circumference surface of the inner circumference part 51c. Optionally, the shaft 53 may be omitted, and the outer ring of the bearing 54 may be fitted on the inner circumference surface of the inner circumference part 51c.

Further, the inner circumference surface of the inner circumference part 51c of the large-diameter roller 50 may be formed in a smaller size, and the shaft 53 of the large-diameter roller 50 may be fixed on the inner circumference part 51c by fitting or the like. In such a configuration, the shaft 53 may be omitted and the inner circumference part 51c may have a form such as integrating the shaft 53.

In this configuration, the outer ring of the bearing 54 may be fitted on an inner circumference surface of the cylindrical portion 74c of the large-diameter-roller support part 74, and the inner ring of the bearing 54 may be fitted on the outer circumference surface of the shaft 53 or the outer circumference surface of the inner circumference part 51c. Also in these cases, the large-diameter roller 50 is rotatably supported by the large-diameter-roller support part 74.

In this embodiment, the small-diameter-roller support part 71 has a base portion 71b that extends toward the outer side in the radial direction of the hub members 20, 30, and a cylindrical portion 71c that extends from the base portion 71b or near the base portion 71b in a direction along the rotational axis RL1 of the corresponding small-diameter roller 40. The cylindrical portion 71c protrudes from the base portion 71b in a direction toward the first fixed part 72.

The inside diameter of the cylindrical portion 71c is slightly larger than the outside diameter of one end side in the axial direction of the shaft 43 of the small-diameter roller 40. Or the inside diameter of the cylindrical portion 71c is equal to the outside diameter of one end side in the axial direction of the shaft 43.

When one end side in the axial direction of the shaft 43 of the corresponding small-diameter roller 40 is inserted into the cylindrical portion 71c, a distal end surface of the cylindrical portion 71c is pressed against an inner ring of the bearing 44, and thereby the inner ring of the bearing 44 is pressed against the step on one end side of the shaft 43 of the corresponding small-diameter roller 40.

In some cases, the small-diameter-roller support part 71 does not have the cylindrical portion 71c. In this case, the base portion 71b is provided with a counterbore and an end portion of the shaft 43 is fitted into this counterbore. In some cases, the small-diameter-roller support part 71 has other structure that can support the other end side of the corresponding small-diameter roller 40.

A structure may be adopted in which an inner circumference surface of the shaft 43 of the small-diameter roller 40 fits on an outer circumference surface of the cylindrical portion 71c of the small-diameter-roller support part 71. In this case, the inner ring of the bearing 44 fits on the outer circumference surface of the cylindrical portion 71c. Or the inner ring of the bearing 44 fits on the outer circumference surface of the shaft 43. Here, an end surface of the shaft 43 is pressed against the inner ring of the bearing 44 in the axial direction and an outer ring of the bearing 44 fits on an inner circumference surface of the core member 41. Optionally, the shaft 43 may be omitted and the outer ring of the bearing 44 may be fitted on the inner circumference surface of the core member 41.

Further, the inner circumference surface of the core member 41 of the small-diameter roller 40 may be formed in a smaller size, and the shaft 43 of the small-diameter roller 40 may be fixed on the core member 41 by fitting or the like. In such a configuration, the shaft 43 may be omitted and the core member 41 may have a form such as integrating the shaft 43.

In this configuration, the outer ring of the bearing 44 may be fitted on the inner circumference surface of the cylindrical portion 71c of the small-diameter-roller support part 71, and the inner ring of the bearing 44 may be fitted on the outer circumference surface of the shaft 43 or the outer circumference surface of the core member 41. Also in these cases, the small-diameter roller 40 is rotatably supported by the small-diameter-roller support part 71.

The connecting part 75 connects the large-diameter-roller support part 74 and the small-diameter-roller support part 71 to each other. In this embodiment, the connecting part 75 connects the base portion 74b of the large-diameter-roller support part 74 and the base portion 71b of the small-diameter-roller support part 71 to each other. The connecting part 75 may connect another portion of the large-diameter-roller support part 74 and another portion of the small-diameter-roller support part 71 to each other.

The connecting part 75 extends mainly in the direction of the rotational axis RL2 of the corresponding large-diameter roller 50 when seen from the extension direction of the rotational axis RL, i.e., when the first arm member 70 is seen as shown in FIG. 1 or FIG. 9. In this embodiment, when the first arm member 70 is seen as shown in FIG. 9, the extension direction of the connecting part 75 is the extension direction of a straight line connecting a center point P1 of the connecting part 75 on the side of the small-diameter-roller support part 71 and a center point P2 of the connecting part 75 on the side of the large-diameter-roller support part 74.

The connecting part 75 can be said to extend mainly in the direction of the rotational axis RL2 when the angle formed by the extension direction of the connecting part 75 and the direction of the rotational axis RL2 as seen from the extension direction of the rotational axis RL is not larger than 30°. Preferably, the connecting part 75 can be said to extend mainly in the direction of the rotational axis RL2 when the angle formed by the extension direction of the connecting part 75 and the direction of the rotational axis RL2 is not larger than 20°. More preferably, the connecting part 75 can be said to extend mainly in the direction of the rotational axis RL2 when the angle formed by the extension direction of the connecting part 75 and the direction of the rotational axis RL2 is not larger than 15°.

As shown in FIG. 9, a small-diameter-roller support part 81 that supports the other end side of the corresponding small-diameter roller 40 is provided on one end side of the second arm member 80, and a second fixed part 82 that is fixed to the hub members 20, 30 is provided on the other end side of the second arm member 80.

As shown in FIGS. 7 to 10, the second arm member 80 further has a base-end-side part 83 that extends from the second fixed part 82 and mainly in the axial direction of the corresponding small-diameter roller 40, a large-diameter-roller support part 84 that supports the large-diameter roller 50, and a connecting part 85 that connects the large-diameter-roller support part 84 and the small-diameter-roller support part 81 to each other.

The small-diameter-roller support part 81 is provided with a hole 81a through which the small-diameter-roller bolt B1, which is described later, passes, and the large-diameter-roller support part 84 is provided with a hole 84a into which the large-diameter-roller bolt B2, which is described later, is screwed.

In this embodiment, a plane CL including a centerline of the hole 81a and a centerline of the hole 84a is the center of the second arm member 80 in a predetermined direction along the rotational axis RL. The second fixed part 82 is disposed not at the very center position relative to that center but at a position offset in the predetermined direction relative to that center (see FIG. 10). In this embodiment, the position of an end of the second fixed part 82 in the predetermined direction coincides with the position of the plane CL. The first fixed part 72 and the second fixed part 82 are located side by side in the predetermined direction, and the first fixed part 72 and the second fixed part 82 are disposed on the opposite sides from each other relative to the center.

The center of the base-end-side part 83 in the width direction may be the center of the second arm member 80 in the predetermined direction along the rotational axis RL.

In this embodiment, the base-end-side part 83 has a substantially plate-like shape, and the position of the center of the base-end-side part 83 in the predetermined direction also is the position of the centerline CL. In this embodiment, at least one of a thickness dimension and a width dimension of the base-end-side part 83 decreases gradually toward one end side of the second arm member 80.

A distal end portion of the base-end-side part 83 bends toward a direction along the rotational axis RL2 of the corresponding large-diameter roller 50, and the large-diameter-roller support part 84 is provided at a distal end of the base-end-side part 83. In this embodiment, the large-diameter-roller support part 84 has a base portion 84b that extends from the distal end of the base-end-side part 83 toward the outer side in the radial direction of the hub members 20, 30, and a cylindrical portion 84c that extends from the base portion 84b or near the base portion 84b in a direction along the rotational axis RL2 of the corresponding large-diameter roller 50. The cylindrical portion 84c protrudes from the base portion 84b in a direction away from the second fixed part 82.

The inside diameter of the cylindrical portion 84c is slightly larger than the outside diameter of one end side in the axial direction of the shaft 53 of the large-diameter roller 50. Or the inside diameter of the cylindrical portion 84c is equal to the outside diameter of one end side in the axial direction of the shaft 53.

When one end side in the axial direction of the shaft 53 of the corresponding large-diameter roller 50 is inserted into the cylindrical portion 84c, a distal end surface of the cylindrical portion 84c is pressed against an inner ring of the bearing 54, and thereby the inner ring of the bearing 54 is pressed against the step on one end side of the shaft 53 of the corresponding large-diameter roller 50.

In some cases, the large-diameter-roller support part 84 does not have the cylindrical portion 84c. In this case, the base portion 84b is provided with a counterbore and an end portion of the shaft 53 is fitted into this counterbore. In some cases, the large-diameter-roller support part 84 has other structure that can support the other end side of the corresponding large-diameter roller 50.

In this embodiment, the small-diameter-roller support part 81 has a base portion 81b that extends toward the outer side in the radial direction of the hub members 20, 30, and a cylindrical portion 81c that extends from the base portion 81b or near the base portion 81b in a direction along the rotational axis RL1 of the corresponding small-diameter roller 40. The cylindrical portion 81c protrudes from the base portion 81b in a direction toward the second fixed part 82.

The inside diameter of the cylindrical portion 81c is slightly larger than the outside diameter of the other end side in the axial direction of the shaft 43 of the small-diameter roller 40. Or the inside diameter of the cylindrical portion 81c is equal to the outside diameter of the other end side in the axial direction of the shaft 43.

When the other end side in the axial direction of the shaft 43 of the corresponding small-diameter roller 40 is inserted into the cylindrical portion 81c, a distal end surface of the cylindrical portion 81c is pressed against the inner ring of the bearing 44, and thereby the inner ring of the bearing 44 is pressed against the step on the other end side of the shaft 43 of the corresponding small-diameter roller 40.

In some cases, the small-diameter-roller support part 81 does not have the cylindrical portion 81c. In this case, the base portion 81b is provided with a counterbore and an end portion of the shaft 43 is fitted into this counterbore. In some cases, the small-diameter-roller support part 81 has other structure that can support the other end side of the corresponding small-diameter roller 40.

The connecting part 85 connects the large-diameter-roller support part 84 and the small-diameter-roller support part 81 to each other. In this embodiment, the connecting part 85 connects the base portion 84b of the large-diameter-roller support part 84 and the base portion 81b of the small-diameter-roller support part 81 to each other. The connecting part 85 may connect another portion of the large-diameter-roller support part 84 and another portion of the small-diameter-roller support part 81 to each other.

The connecting part 85 extends mainly in the direction of the rotational axis RL2 of the corresponding large-diameter roller 50 when seen from the extension direction of the rotational axis RL, i.e., when the second arm member 80 is seen as shown in FIG. 1 or FIG. 9. The definition of the extension direction of the connecting part 85 is the same as the definition of the extension direction of the connecting part 75 of the first arm member 70.

Figure 3:
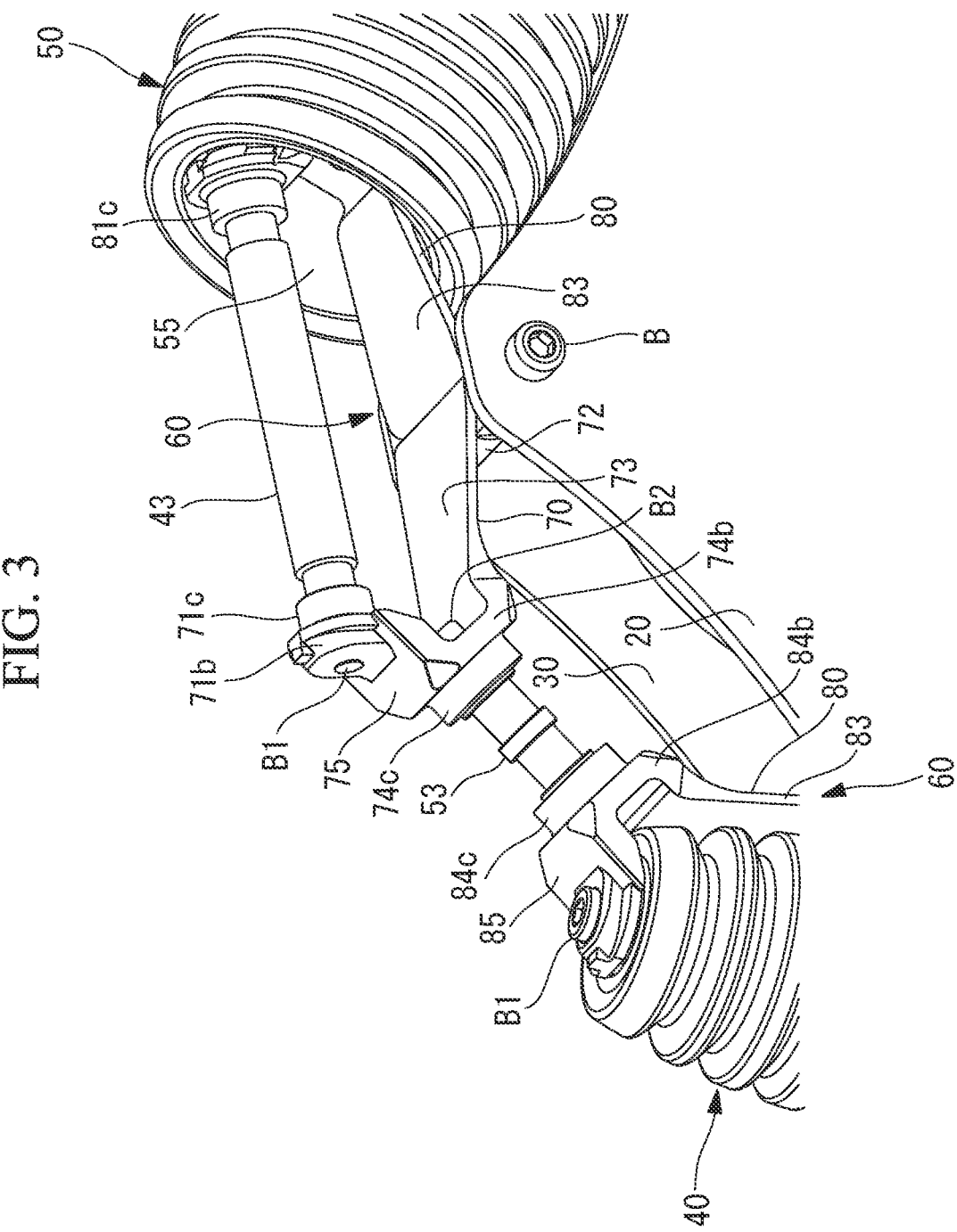
FIG. 3 is a perspective view of the omnidirectional wheel according to the first embodiment, with some rollers removed.

As shown in FIG. 1 and FIG. 3, the large-diameter-roller bolt B2 passes through the hole 74a of the first arm member 70 and the shaft 53 of the large-diameter roller 50 and is screwed into the hole 84a of the second arm member 80. Thus, the corresponding large-diameter roller 50 is supported by a pair of adjacent supports 60. When the hole 84a is not an internally threaded hole, a nut is provided near the hole 84a.

The small-diameter-roller bolt B1 passes through the hole 81a of the second arm member 80 and the shaft 43 of the small-diameter roller 40 and is screwed into the hole 71a of the first arm member 70. Thus, the corresponding small-diameter roller 40 is supported by the support 60. When the hole 71a is not an internally threaded hole, a nut is provided near the hole 71a. When the nut is made of a material having higher strength than aluminum, such as iron, the small-diameter roller 40 can be securely fixed by the small-diameter-roller bolt B1. The nut may be fitted in a hole provided in the first arm member 70.

The first fixed part 72 is provided with a hole 72a that extends through the first fixed part 72 in a direction along the rotational axis RL, and the second fixed part 82 is also provided with a hole 82a that extends through the second fixed part 82 in a direction along the rotational axis RL.

As shown in FIG. 4, the hub members 20, 30 have holes 21, 31 formed at positions corresponding to the small-diameter roller 40. The bolt B passes through the hole 21 of the hub member 20, the hole 72a of the first fixed part 72, the hole 82a of the second fixed part 82, and the hole 31 of the hub member 30 and is screwed into an internally threaded hole of a nut N. Thus, the plurality of supports 60 is each mounted to the hub members 20, 30. An internally threaded hole may be formed in the hub member 30. FIG. 3 shows a state where the shafts 43, 53 are fixed on the supports 60.

In a direction along the rotational axis RL1 of the corresponding small-diameter roller 40, the positions of the first fixed part 72 and the second fixed part 82 are aligned with a center position of the corresponding small-diameter roller 40.

Figure 7:
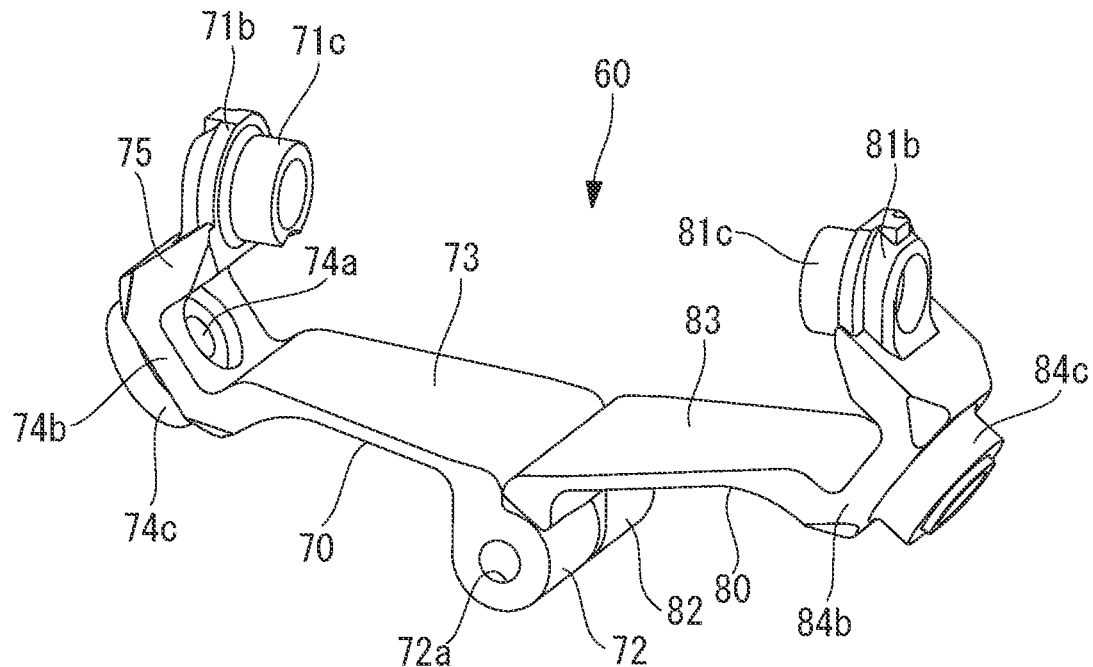
FIG. 7 is a perspective view of a support used in the omnidirectional wheel according to the first embodiment.
Figure 8:
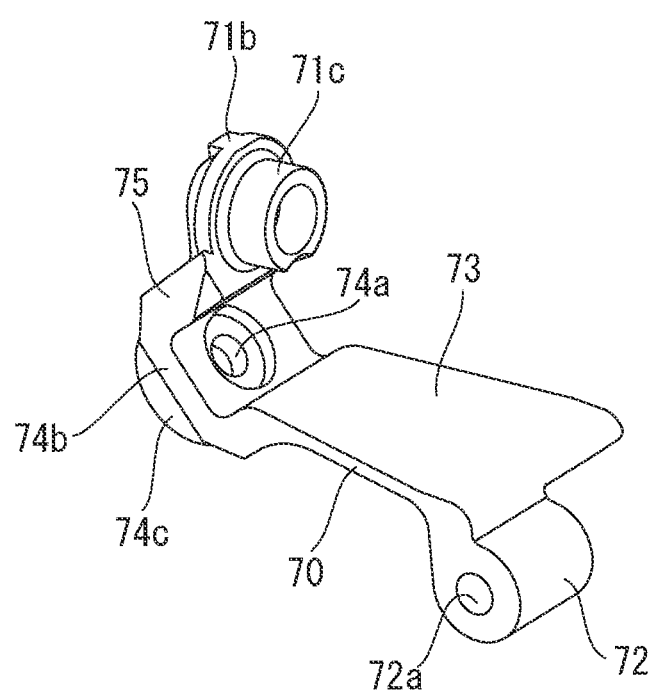
FIG. 8 is a perspective view of a first arm member used in the omnidirectional wheel according to the first embodiment.

In this embodiment, a portion where the second fixed part 82 is not provided in the base end of the base-end-side part 83 of the second arm member 80 fixed as described above contacts the first fixed part 72 or the base-end-side part 73 of the first arm member 70, or is located close to the first fixed part 72 or the base-end-side part 73 (see FIG. 7 and FIG. 9). Thus, when the second arm member 80 is subjected to a great force in a wheel radial direction, a wheel width direction, or the like, deformation of the base-end-side part 83 of the second arm member 80 is limited by the first fixed part 72 or the base-end-side part 73.

Further, a portion where the first fixed part 72 is not provided in the base end of the base-end-side part 73 of the first arm member 70 fixed as described above contacts the second fixed part 82 or the base-end-side part 83 of the second arm member 80, or is located close to the second fixed part 82 or the base-end-side part 83. Thus, when the first arm member 70 is subjected to a great force in the wheel radial direction, the wheel width direction, or the like, deformation of the base-end-side part 73 of the first arm member 70 is limited by the second fixed part 82 or the base-end-side part 83.

In this embodiment, the first arm member 70 and the second arm member 80 are the same except that the hole 71a is an internally threaded hole while the hole 81a is a through-hole and that the hole 74a is a through-hole while the hole 84a is an internally threaded hole. Thus, the first arm member 70 and the second arm member 80 have the same shape at least except for the holes 71a, 74a, 81a, 84a, and when reversed, the shape of the first arm member 70 matches the shape of the second arm member 80. This configuration is advantageous for reducing the manufacturing cost.

When producing the omnidirectional wheel 1, the large-diameter roller 50 is supported between a pair of supports 60 by the large-diameter-roller bolt B2, and then the small-diameter roller 40 is supported on one of the pair of supports 60 by the small-diameter-roller bolt B1, and subsequently another large-diameter roller 50 is supported in the same manner. Through repetition of this operation, the pluralities of rollers 40, 50 are coupled together in the circumferential direction of the omnidirectional wheel 1.

As shown in FIG. 1, each end portion in the axial direction of the large-diameter roller 50 has a recess 55 into which a portion of one end in the axial direction of the small-diameter roller 40 enters. As a portion of one end in the axial direction of the small-diameter roller 40 is disposed inside the recess 55 of the large-diameter roller 50, the distance between the small-diameter roller 40 and the large-diameter roller 50 in the circumferential direction is reduced.

In coupling the pluralities of rollers 40, 50 together in the circumferential direction as described above, when mounting the last one of the plurality of rollers 40 to the support 60 by the small-diameter-roller bolt B1, the head of this small-diameter-roller bolt B1 cannot be turned by a tool. This is clear from FIG. 1 etc.

Figure 11:
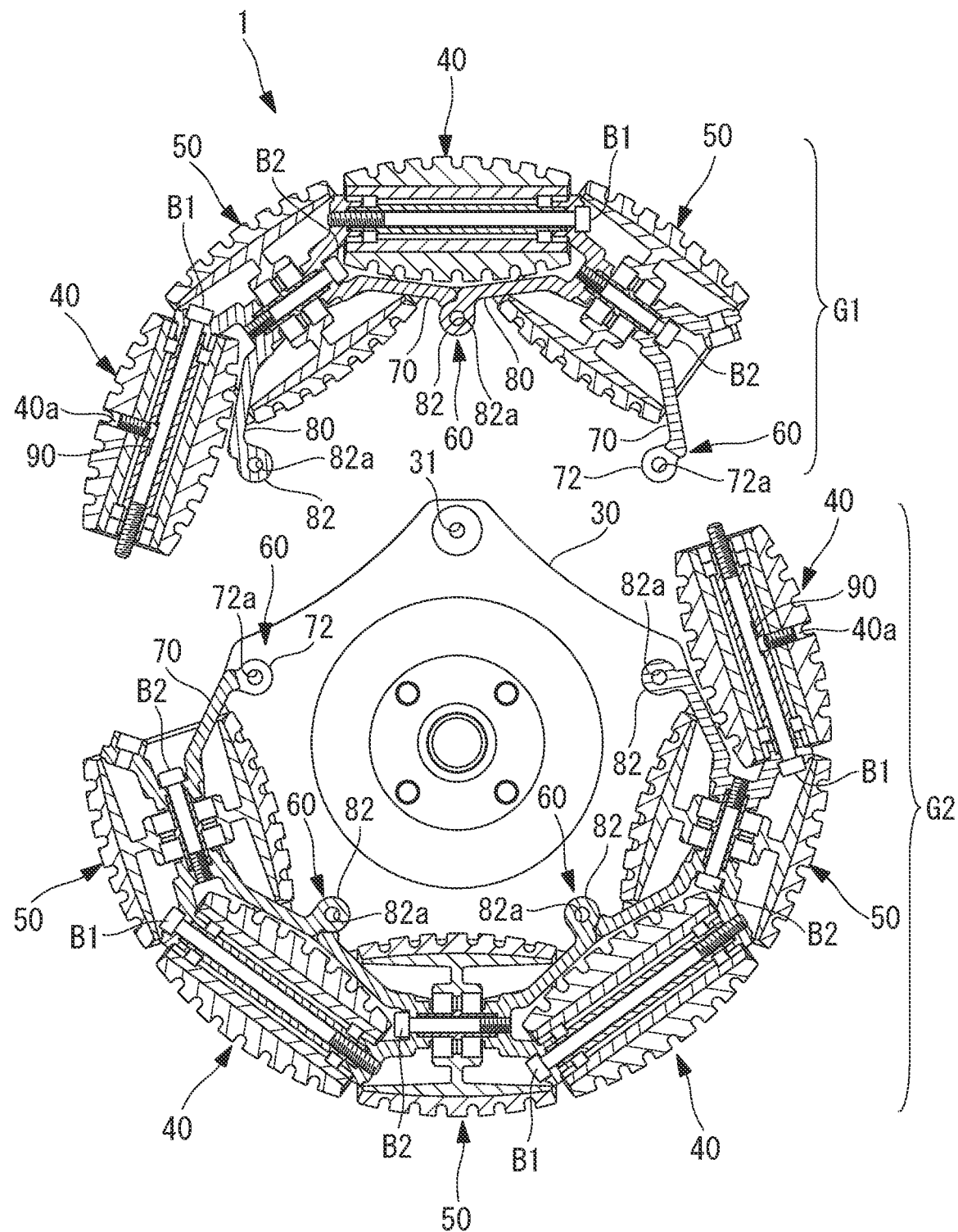
FIG. 11 is a sectional view of the omnidirectional wheel according to the first embodiment.

To solve this problem, for example, as shown in FIG. 11, a first roller group G1 and a second roller group G2 each having at least one small-diameter roller 40 and at least one large-diameter roller 50 are formed. In each of the roller groups G1, G2, the large-diameter rollers 50 and the small-diameter rollers 40 are supported on the supports 60 by the bolts B1, B2. It is also possible to form three or more roller groups.

As shown in FIG. 1 and FIG. 11, to connect the plurality of roller groups G1, G2 to each other, the small-diameter roller 40 located at an end in each of the roller groups G1, G2 has a hole 40a that extends from the outer circumference surface of the small-diameter roller 40 to the inner circumference surface of the shaft 43 of the small-diameter roller 40. An outer circumference surface of the small-diameter-roller bolt B1 for this small-diameter roller 40 has a chamfered portion (engaging portion) 90 formed at a position corresponding to the hole 40a.

Figure 12:
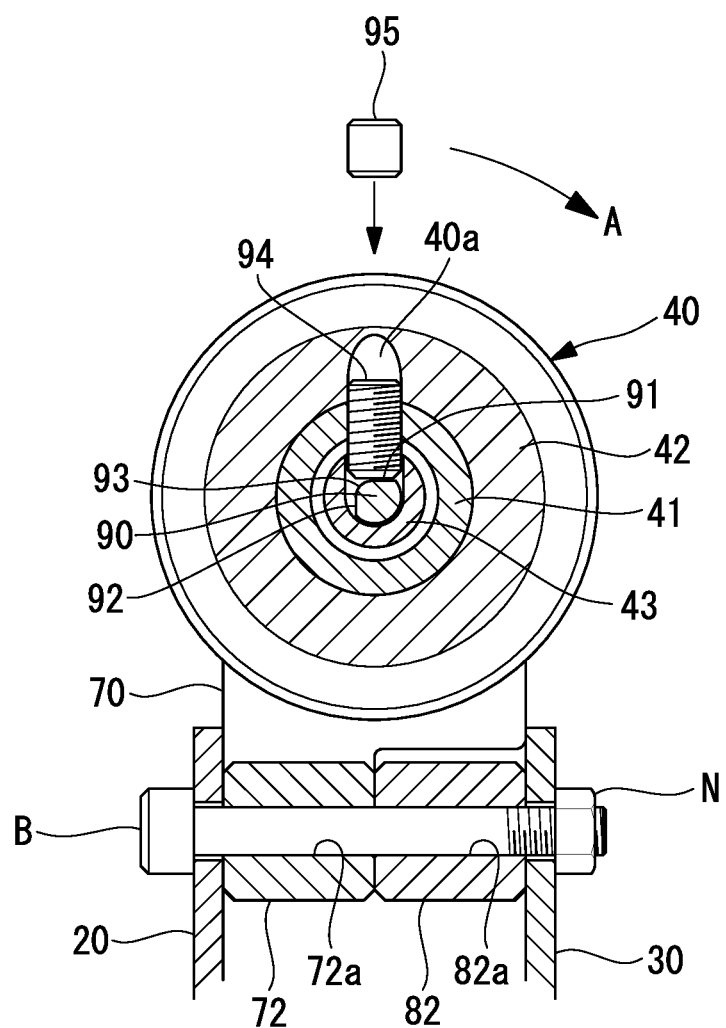
FIG. 12 is a sectional view taken along line XII-XII in FIG. 1.

As shown in FIG. 1 and FIG. 12, the chamfered portion 90 has a first flat surface part 91, a second flat surface part 92 located at a different position from the first flat surface part 91 in a circumferential direction of the outer circumference surface of the small-diameter-roller bolt B1, and a curved surface 93 that connects the first flat surface part 91 and the second flat surface part 92 to each other.

The hole 40a extends through the outer circumference member 42, the core member 41, and the shaft 43 of the small-diameter roller 40. For example, a part of the hole 40a that is provided in the core member 41 or the shaft 43 has an internal thread.

A screw member 94 is screwed onto the internal thread and a screwdriver is engaged in a groove formed in an end surface of the screw member 94 to fasten the screw member 94 toward the small-diameter-roller bolt B1. Thus, the screw member 94 engages with the chamfered portion 90. In this state, the small-diameter roller 40 is turned in a predetermined direction by a tool, hand, etc., so that the small-diameter-roller bolt B1 rotates along with the small-diameter roller 40 and the small-diameter-roller bolt B1 is screwed into the hole 71a of the first arm member 70. Thus, the shaft 43 of the small-diameter roller 40 is fixed to the first arm member 70 and the second arm member 80 by the small-diameter-roller bolt B1. This operation may be performed in a state where some of the supports 60 have been mounted to the hub members 20, 30, or the supports 60 may be mounted to the hub members 20, 30 after the rollers 40, 50 have been coupled together.

Subsequently, the screw member 94 is moved toward the outer side in the radial direction of the small-diameter roller 40 by a screwdriver. Thus, the small-diameter roller 40 is allowed to rotate. In some cases, the screw member 94 functions as a plug member that closes the hole 40a. On the other hand, a plug member 95 may be mounted to the hole 40a as shown in FIG. 1 after the screw member 94 is removed from the hole 40a (FIG. 12).

On the other hand, the plurality of small-diameter rollers 40 and the plurality of large-diameter rollers 50 may be sequentially coupled together using the plurality of first arm members 70, the plurality of second arm members 80, the plurality of small-diameter-roller bolts B1, and the plurality of large-diameter-roller bolts B2, and the small-diameter-roller bolt B1 of the last small-diameter roller 40 may be screwed into the first arm member 70.

When fastening the small-diameter-roller bolt B1 into the hole 71a of the first arm member 70, the small-diameter roller 40 and the screw member 94 rotate in the direction of arrow A of FIG. 12 and the screw member 94 engages with the first flat surface part 91. Here, the chamfered portion 90 has the second flat surface part 92 and the curved surface part 93. Therefore, when the small-diameter roller 40 is rotated in the opposite direction from arrow A, the screw member 94 moves from the first flat surface part 91 to the second flat surface part 92 through the curved surface part 93.

In some cases, the hole 40a is disposed on the side of the support 60 upon completion of fastening of the small-diameter-roller bolt B1 by rotating the small-diameter roller 40 in the direction of arrow A. In this state, the screw member 94 cannot be separated from the small-diameter-roller bolt B1, and the small-diameter roller 40 cannot rotate. When the second flat surface part 92 and the curved surface part 93 are provided, the small-diameter roller 40 can be moved in the opposite direction from arrow A upon completion of fastening of the small-diameter-roller bolt B1. Therefore, the hole 40a can be moved to a position that does not correspond to the support 60, and the screw member 94 can be moved away from the small-diameter-roller bolt B1.

Figure 13:
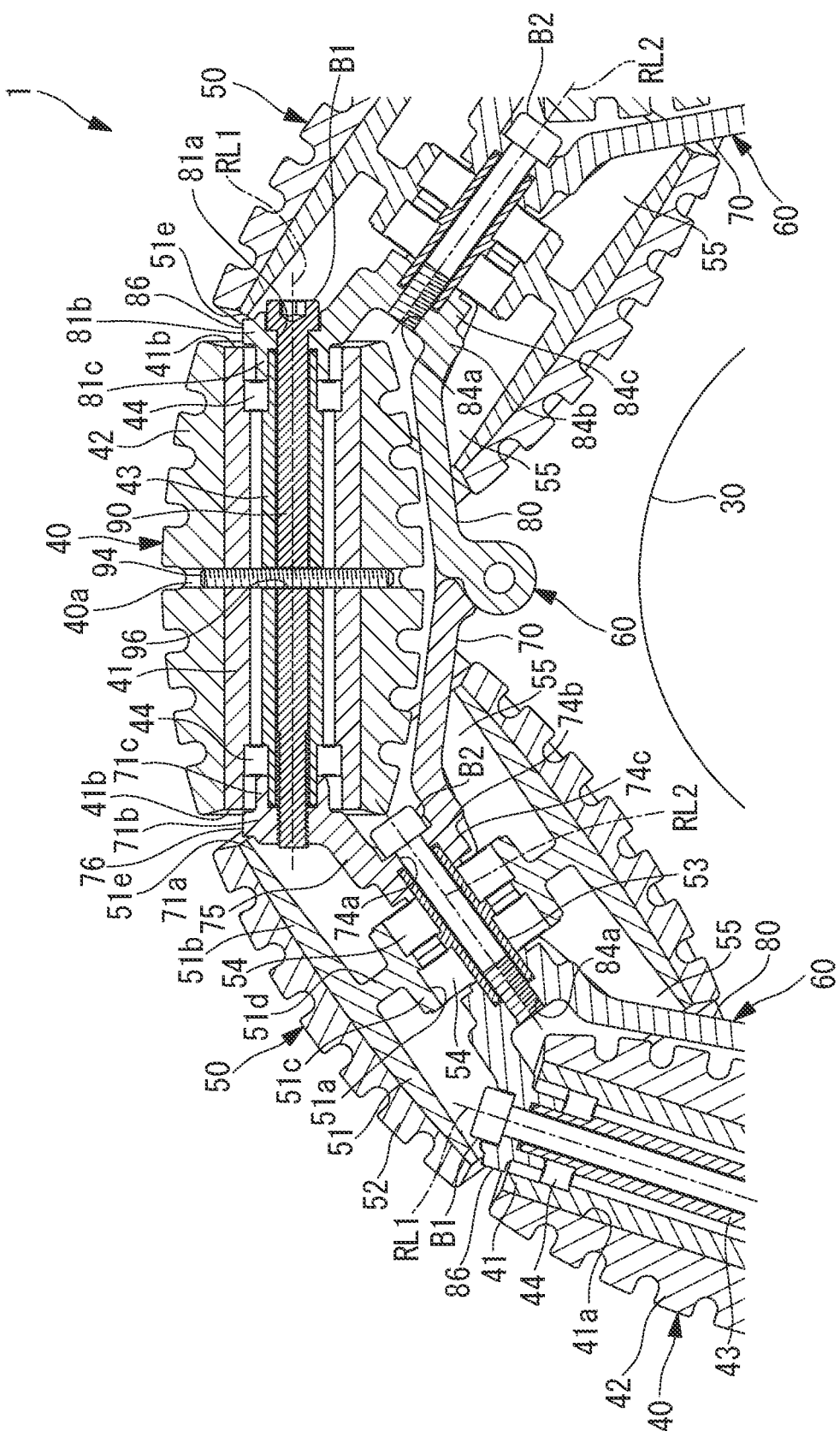
FIG. 13 is a sectional view of an omnidirectional wheel according to a first modified example of the first embodiment.

As shown in FIG. 13, it is also possible to provide the small-diameter-roller bolt B1 with a hole 96 instead of the chamfered portion 90. In this case, the hole 40a may extend through the small-diameter roller 40 in the radial direction. The screw member 94 passes through the hole 96 and the hole 40a and is screwed onto an internal thread provided in, for example, the core member 41 or the shaft 43 inside the hole 40a. Rotating the small-diameter roller 40 in this state can fasten the small-diameter-roller bolt B1 into the first arm member 70. It is preferable that each end of the screw member 94 have a groove in which a screwdriver engages.

Figure 14:
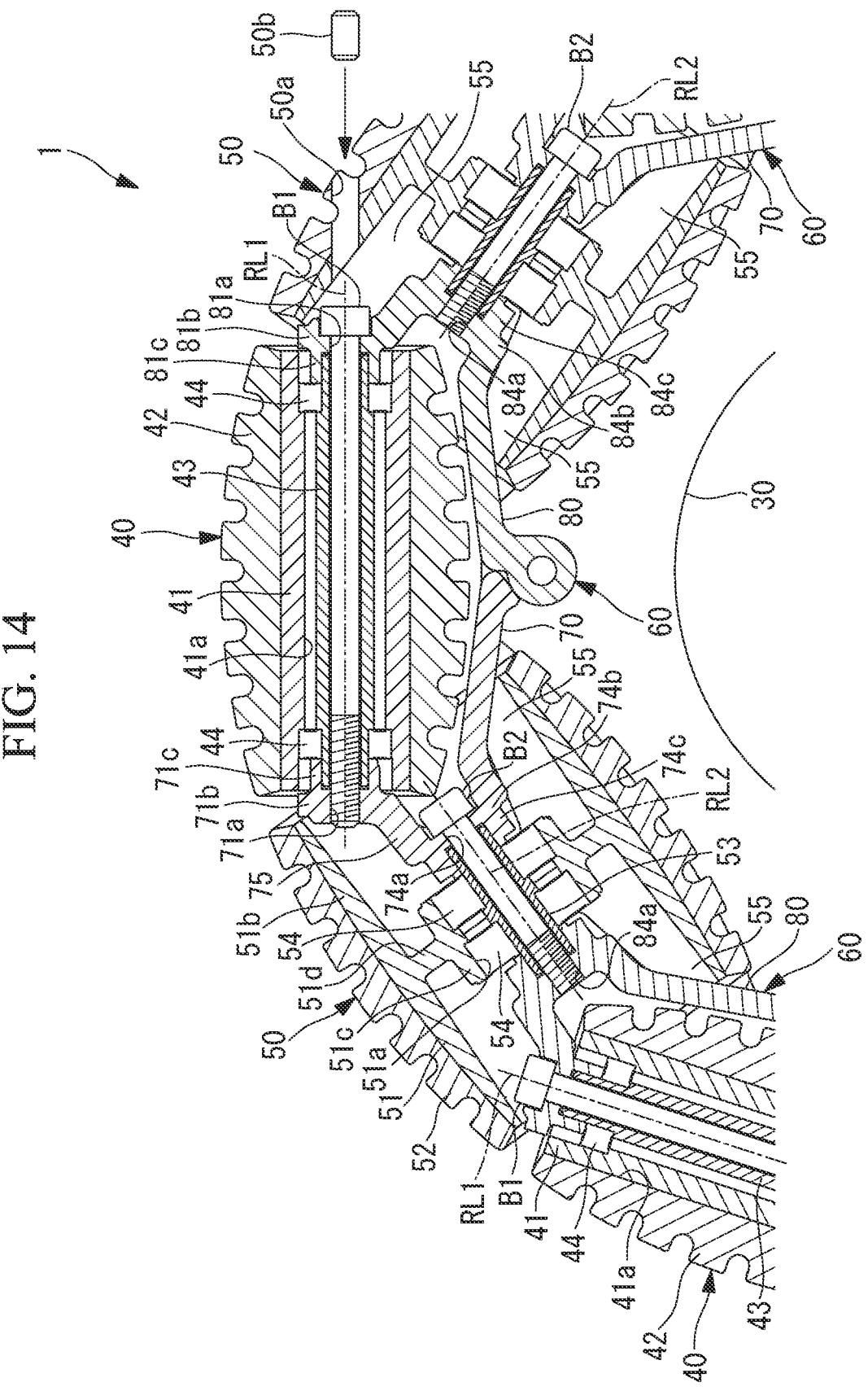
FIG. 14 is a sectional view of an omnidirectional wheel according to a second modified example of the first embodiment.

As shown in FIG. 14, the large-diameter roller 50 near the head of the small-diameter-roller bolt B1 to be lastly fastened may have a hole 50a that extends from the outer circumference surface of the large-diameter roller 50 to the recess 55 of the large-diameter roller 50. In this case, a bolt turning tool passes through the hole 50a, and the small-diameter roller 40 can be fastened into the hole 71a of the first arm member 70 by the bolt turning tool. The hole 50a may be closed with a plug member 50b.

Figure 15:
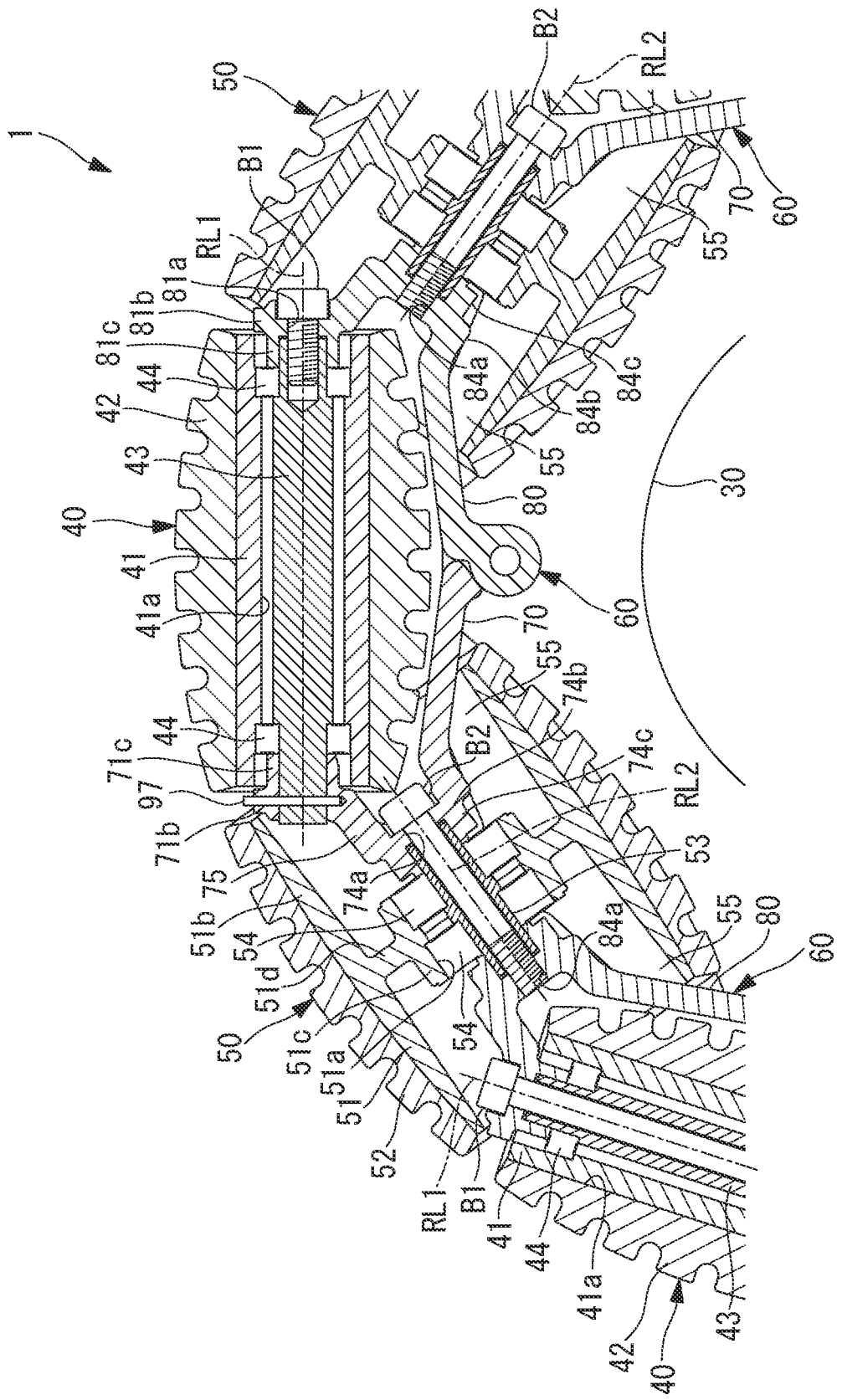
FIG. 15 is a sectional view of an omnidirectional wheel according to a third modified example of the first embodiment.

As shown in FIG. 15, one end side of the shaft 43 of the small-diameter roller 40 to be lastly mounted to the first arm member 70 may be fixed to the first arm member 70 using a fixing member 97. In this case, the one end side of the shaft 43 is provided with a hole that extends through the shaft 43 in the radial direction, and the first arm member 70 is also provided with a hole at a position corresponding to the hole of the shaft 43. The fixing member 97 is fixed to the first arm member 70 in a state where the fixing member 97 is passed through the hole of the first arm member 70 and the hole of the shaft 43. Thus, one end side of the shaft 43 of the small-diameter roller 40 is fixed to the first arm member 70.

In this case, as shown in FIG. 15, the other end side of the shaft 43 of the small-diameter roller 40 is fixed to the second arm member 80 by a short small-diameter-roller bolt B1.

The fixing member 97 is a pin, bolt, screw member, rivet, or the like made of metal.

Figure 16:
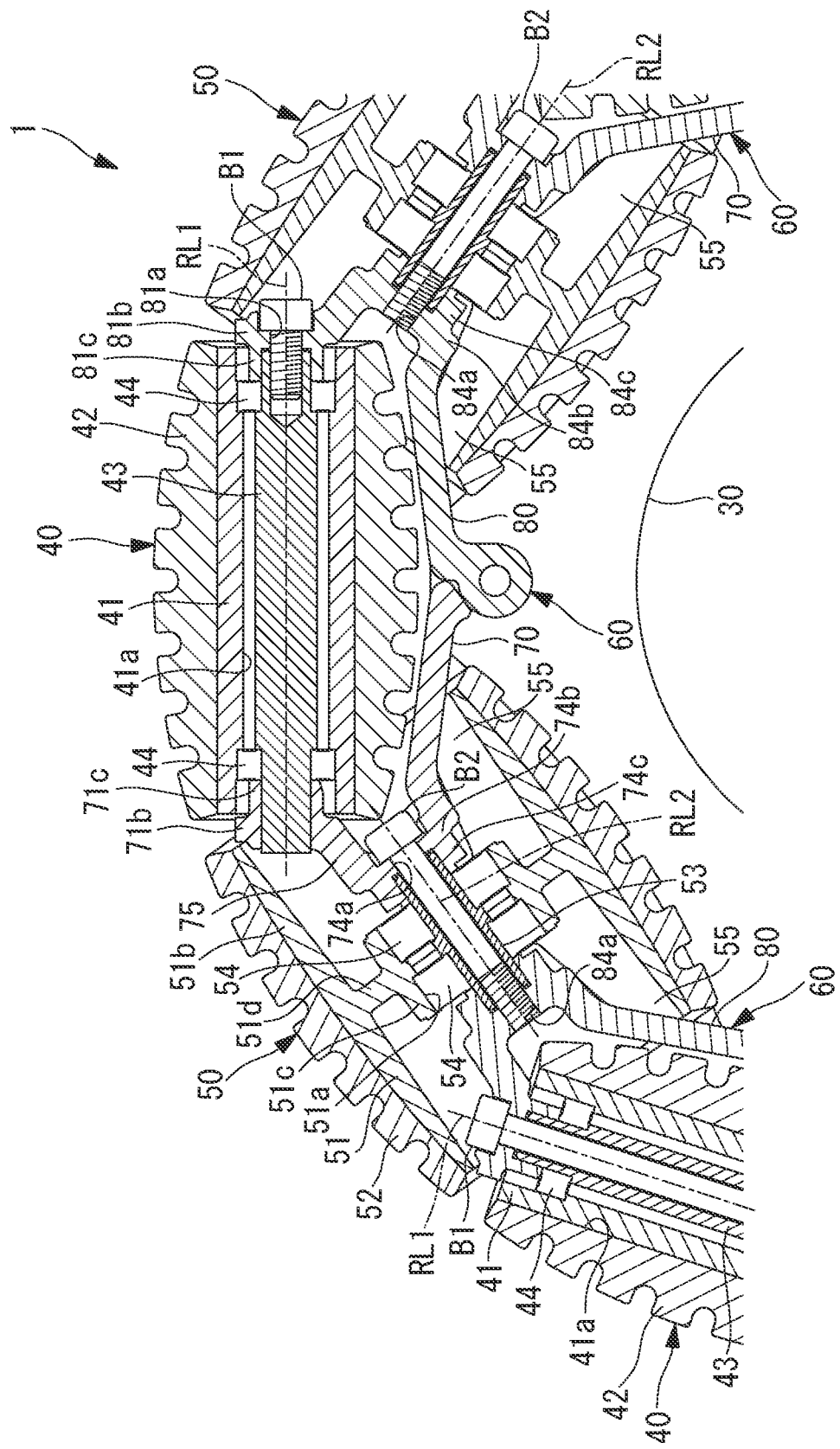
FIG. 16 is a sectional view of an omnidirectional wheel according to a fourth modified example of the first embodiment.

As shown in FIG. 16, one end side of the shaft 43 of the small-diameter roller 40 to be mounted to the first arm member 70 last may be fixed to the first arm member 70 using an adhesive.

In each of the above embodiments, a part or the whole of the shaft 43 in its length direction may be solid as shown in FIG. 15, or the whole of the shaft 43 in its length direction may be hollow.

Figure 5:
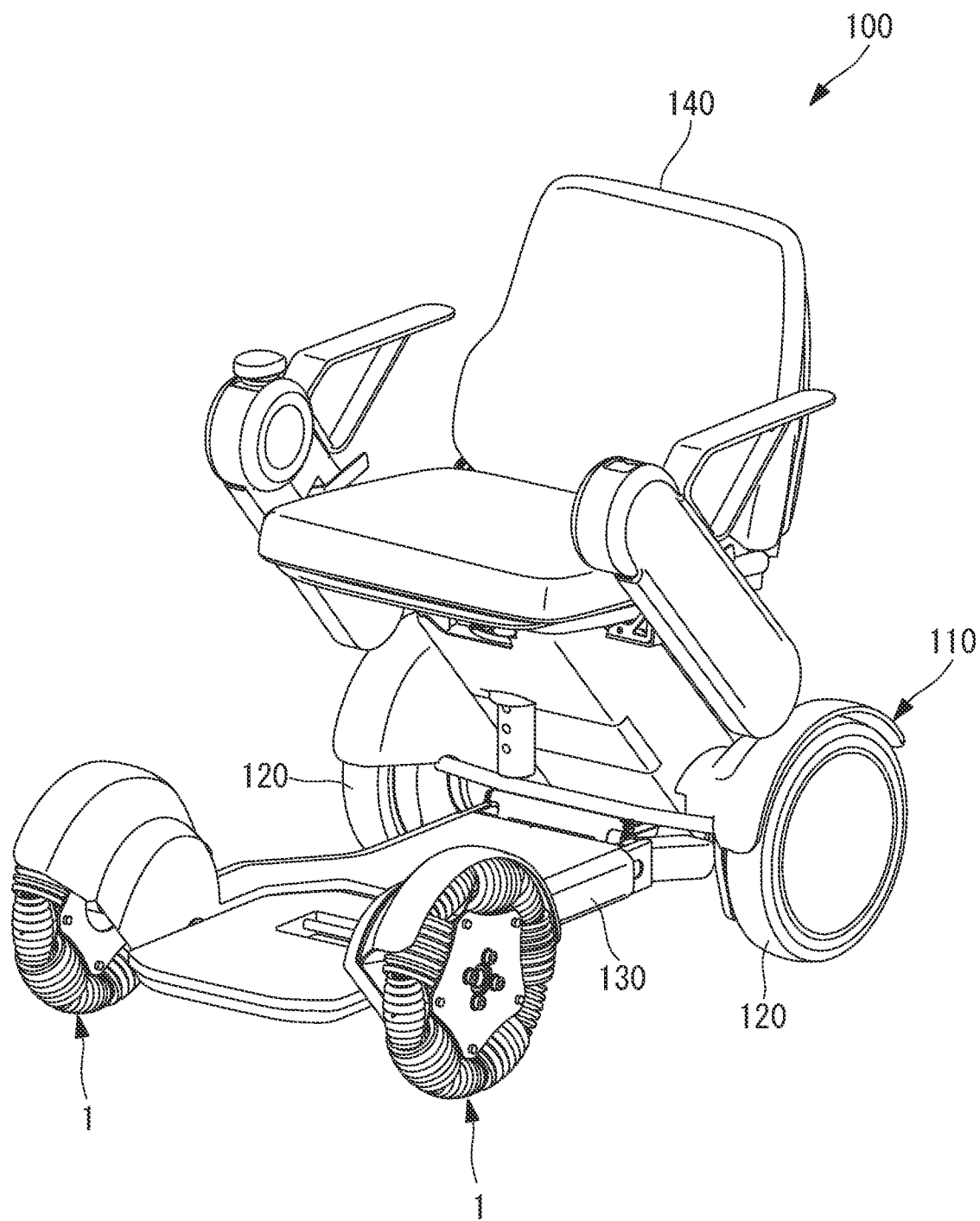
FIG. 5 is a perspective view of an electric mobility vehicle in which the omnidirectional wheel according to the first embodiment is used.

The omnidirectional wheel 1 thus configured is used, for example, as front wheels of an electric mobility vehicle 100 that one person rides by sitting in a sheet (see FIG. 5). The omnidirectional wheel 1 may be used as rear wheels of the electric mobility vehicle 100 or other wheels. It is also conceivable that the omnidirectional wheel 1 is used as a wheel of other machine, such as a robot, or used as a wheel of other vehicle.

For example, as shown in FIG. 5 and FIG. 6, the electric mobility vehicle 100 includes the omnidirectional wheels 1 as front wheels, rear wheels 120, and a mobility main body 110 having a body 130 that is supported by the omnidirectional wheels 1 and the rear wheels 120. Further, this electric mobility vehicle includes a seat unit (seat) 140 that is detachably mounted on the mobility main body 110, and drive devices 150, such as motors, that are mounted on the mobility main body 110 and drive at least either the omnidirectional wheels 1 or the rear wheels 120.

When the omnidirectional wheel 1 is used for such an electric mobility vehicle, each of the rollers 40, 50 of the omnidirectional wheel 1 is subjected to a great force. It is not uncommon that an electric mobility vehicle weighs 50 kg or more, and some electric mobilities can weigh close to 100 kg. Drivers riding electric mobilities also vary in weight. Moreover, electric mobilities sometimes climb over a step and other times travel on a road with many bumps and dips. Therefore, it is not uncommon that each of the rollers 40, 50 is subjected to a force of 300 N or greater, and may even be subjected to a force exceeding 500 N. In addition, such an electric mobility vehicle is used almost daily over a long period of time. Therefore, the omnidirectional wheel 1 is required to have high levels of strength and durability.

In this embodiment, each corresponding small-diameter roller 40 is supported by the support 60, with one end side in the axial direction of the corresponding small-diameter roller 40 supported by the first arm member 70 and the other end side in the axial direction of the corresponding small-diameter roller 40 supported by the second arm member 80. Each corresponding large-diameter roller 50 is supported by the first arm member 70 of one of two supports 60 that are adjacent to each other in the circumferential direction and the second arm member 80 of the other one of the two supports 60. Thus, the small-diameter roller 40 is supported not by a single member but by the first arm member 70 and the second arm member 80. The large-diameter roller 50 is supported at one end side by the second arm member 80 and at the other end side by the first arm member 70.

Thus, compared with a configuration where the small-diameter roller 40 is supported by a single member, adjacent parts are connected to each other more tightly, which makes it more likely that a force applied to the small-diameter roller 40 upon contact with a road surface is transmitted to the adjacent large-diameter rollers 50. In turn, the force applied to the large-diameter rollers 50 is more likely to be transmitted to the adjacent small-diameter rollers 40. A force applied to the large-diameter roller 50 upon contact with a road surface is also more likely to be transmitted to the adjacent small-diameter rollers 40. This configuration makes it possible to effectively bear the force applied to each of the rollers 40, 50 by the adjacent rollers 40, 50 and the arm members 70, 80 thereof while reducing the thicknesses of the first arm member 70 and the second arm member 80.

Compared with a configuration where the small-diameter roller 40 is supported by a single member, one end side of the small-diameter roller 40 is more likely to be disposed at the correct position relative to the first arm member 70 when the rollers 40, 50 and the supports 60 are mounted to the hub members 20, 30. The other end side of the small-diameter roller 40 is also more likely to be disposed at the correct position relative to the second arm member 80. This configuration is advantageous for effectively bearing the force applied to each of the rollers 40, 50 by the adjacent rollers 40, 50 and the arm members 70, 80 thereof. Thus, it is possible to achieve a high level of compatibility between increasing the force that each of the rollers 40, 50 can bear and reducing the weight of the wheel.

In this embodiment, one end side in the axial direction of the corresponding small-diameter roller 40 is supported by one end side of the first arm member 70, and the other end side of the first arm member 70 is mounted on the hub members 20, 30. The other end side in the axial direction of the corresponding small-diameter roller 40 is supported by one end side of the second arm member 80, and the other end side of the second arm member 80 is mounted on the rollers 40, 50. Thus, in the first arm member 70, the part that supports the corresponding small-diameter roller 40 and the part that is mounted to the hub members 20, 30 are spaced apart from each other, so that a force applied to the small-diameter roller 40 is more likely to be transmitted to the adjacent large-diameter rollers 50, and the force applied to the large-diameter roller 50 is also more likely to be transmitted to the adjacent small-diameter rollers 40.

Since the part that supports the corresponding small-diameter roller 40 and the part that is mounted to the hub members 20, 30 are spaced apart from each other in the first arm member 70, when the rollers 40, 50 and the supports 60 are mounted to the hub members 20, 30, one end side of the first arm member 70 is more likely to be disposed at the correct position relative to one end side of the corresponding small-diameter roller 40, and one end side of the second arm member 80 is more likely to be disposed at the correct position relative to the other end side of the corresponding small-diameter roller 40.

In this embodiment, each support 60 supports the corresponding small-diameter roller 40, and one end side in the axial direction and the other end side in the axial direction of the corresponding small-diameter roller 40 are fixed to the first arm member 70 and the second arm member 80 by one small-diameter-roller bolt (fixing member) B1 that extends in the axial direction of the corresponding small-diameter roller 40. This configuration makes it more likely that a force applied to the small-diameter roller 40 or the large-diameter roller 50 is sequentially transmitted to the plurality of adjacent small-diameter rollers 40 and large-diameter rollers 50.

In this embodiment, each pair of supports 60 supports the corresponding large-diameter roller 50, and the corresponding large-diameter roller 50 is fixed to the first arm member 70 and the second arm member 80 by one large-diameter-roller bolt B2 (fixing member) that extends in the axial direction of the corresponding large-diameter roller 50. This configuration makes it more likely that a force applied to the small-diameter roller 40 or the large-diameter roller 50 is further transmitted to the plurality of adjacent small-diameter rollers 40 and large-diameter rollers 50.

In this embodiment, when seen from the extension direction of the rotational axis RL, the connecting part 75 that connects the small-diameter-roller support part 71 and the large-diameter-roller support part 74 in the first arm member 70 extends mainly in the direction of the rotational axis RL2 of the corresponding large-diameter roller 50. This configuration makes it more likely that a force applied to the small-diameter roller 40 or the large-diameter roller 50 is further transmitted to the plurality of adjacent small-diameter rollers 40 and large-diameter rollers 50. In addition, this configuration is advantageous for reducing the thickness of the connecting part 75. In this embodiment, the connecting part 85 of the second arm member 80 has the same structure and produces the same effects.

In this embodiment, the other end side of the first arm member 70 and the other end side of the second arm member 80 overlap each other in the predetermined direction along the rotational axis RL. In this embodiment, the first fixed part 72 on the other end side of the first arm member 70 and the second fixed part 82 on the other end side of the second arm member 80 overlap each other in the predetermined direction along the rotational axis RL, and the first fixed part 72 and the second fixed part 82 are mounted on the hub members 20, 30. As described above, a force applied to the small-diameter roller 40 or the large-diameter roller 50 is more likely to be further transmitted to the plurality of adjacent small-diameter rollers 40 and large-diameter rollers 50. Thus, the omnidirectional wheel 1 of this embodiment can bear the force applied to the small-diameter rollers 40 and the large-diameter rollers 50 while having a reduced number of parts.

In this embodiment, the single first fixed part 72 and the single second fixed part 82 overlap each other in the predetermined direction along the rotational axis RL. This makes it possible to securely mount the first fixed part 72 and the second fixed part 82 to the hub members 20, 30 without having a machining process to an end surface in the predetermined direction of the first fixed part 72 and an end surface in the predetermined direction of the second arm member 80. This contributes to reducing the manufacturing cost of the arm members 70, 80.

Optionally, the first arm member 70 may be provided with a plurality of first fixed parts 72, and the second arm member 80 may be provided with a plurality of second fixed parts 82, and the plurality of first fixed parts 72 and the plurality of second fixed parts 82 may alternate with each other in the predetermined direction.

In this embodiment, the first fixed part 72 is formed at a position offset toward one side in the predetermined direction relative to the center of the first arm member 70 in the direction along the rotational axis RL. The second fixed part 82 is formed at a position offset toward the other side in the predetermined direction relative to the center of the second arm member 80 in the direction along the rotational axis RL. This configuration makes it possible to secure the strength of the first arm member 70 and the second arm member 80 mounted on the hub members 20, 30 while reducing the dimension of the omnidirectional wheel 1 in the direction along the rotational axis RL.

In this embodiment, at least one of the pluralities of rollers 40, 50 has the hole 40a or 50a that extends from the outer circumference surface to the inner circumference surface of the roller. In this embodiment, the pluralities of rollers 40, 50 are connected into a ring using this hole 40a or 50a.

The holes 40a, 50a may be closed with the plug members 95, 50b that close the holes 40a, 50a.

In this embodiment, the at least one roller is the small-diameter roller 40, and the one end side and the other end side in the axial direction of the small-diameter roller 40 are mounted to the support 60 by one small-diameter-roller bolt B1 that extends in the axial direction of the small-diameter roller, and the outer circumference surface of the small-diameter-roller bolt B1 has the chamfered portion (engaging portion) 90 or the hole (engaging portion) 96 formed at the axial position corresponding to the hole 40a. Thus, when the screw member 94 is inserted into the hole 40a and the screw member 94 engages with the chamfered portion 90 or the hole 96, the first roller 40 is rotated to fasten the first roller bolt B1 into the first arm member 70.

An omnidirectional wheel 1 according to a second embodiment of the present invention will be described below with reference to the drawings.

Figure 17:
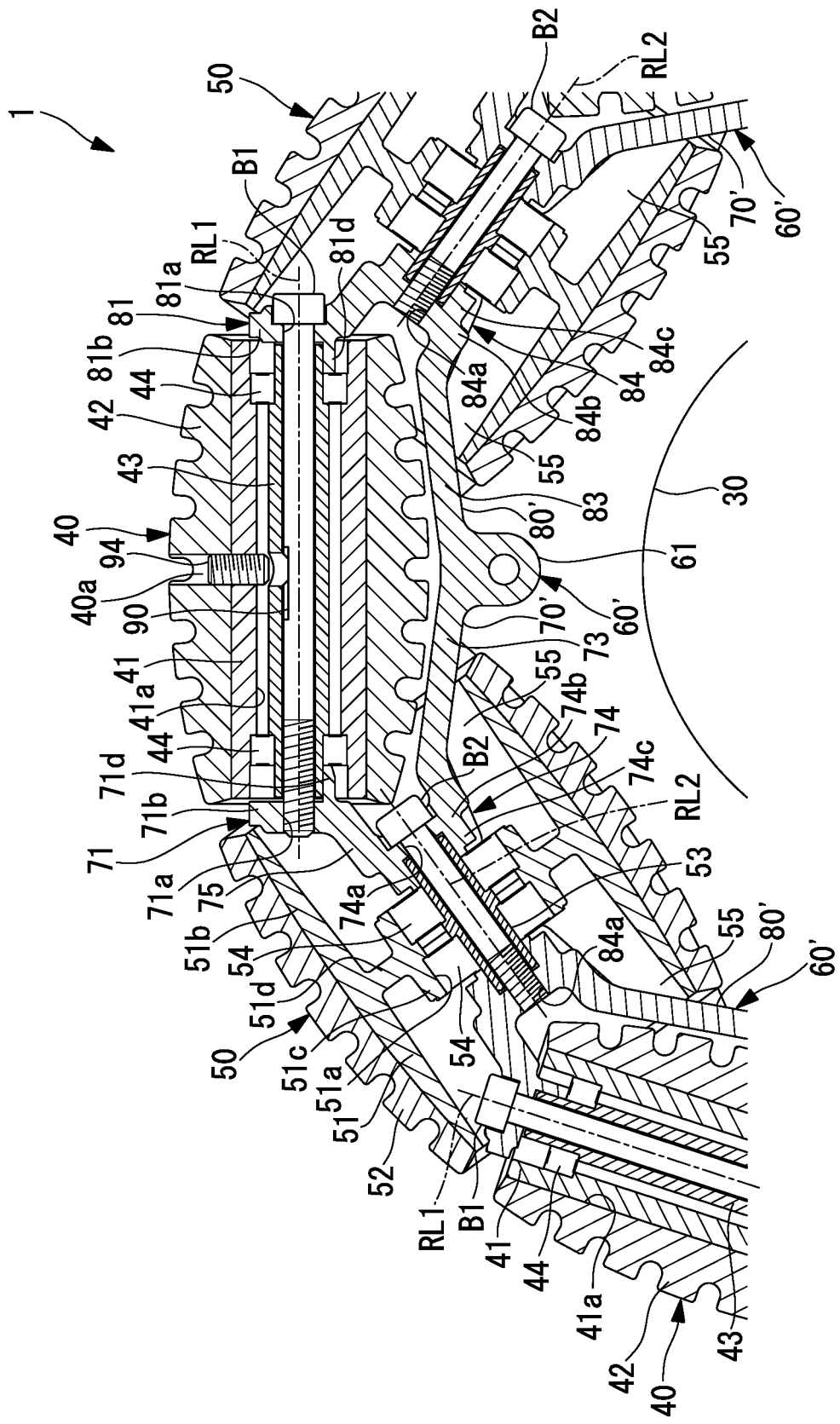
FIG. 17 is a sectional view of an omnidirectional wheel according to a second embodiment of the present invention.

As shown in FIG. 17, in the omnidirectional wheel 1 of the second embodiment, the first arm member 70 and the second arm member 80 of the support 60 in the first embodiment are integrated. The same constituent elements as shown in the first embodiment will be denoted by the same reference signs and the descriptions thereof will be omitted.

In the omnidirectional wheel 1 of the first embodiment, the support 60 includes the two parts, the first arm member 70 and the second arm member 80. Instead, in the omnidirectional wheel 1 of the second embodiment, the support 60' is one part and the support 60' includes a first arm 70' and a second arm 80'. The first arm member 70 and the first arm 70' differ from each other only in the shape of the base end side and the shape of a part of the distal end side, and therefore will be denoted by the same reference sign. The second arm member 80 and the second arm 80' differ from each other only in the shape of the base end side and the shape of a part of the distal end side, and therefore will be denoted by the same reference sign.

The support 60' is made of metal, such as aluminum, and formed by performing casing. The support 60' may be formed by sintering metal powder. The support 60' may be formed by a metal plate, such as an iron plate, and may be formed by performing pressing. The support 60' may be made of metal, plastic, or both plastic and metal. The support 60' may be made of metal, such as aluminum or iron, and may be formed by casting.

As shown in FIG. 17, to support one end side of the corresponding small-diameter roller 40, a small-diameter-roller support part 71 having the same hole 71a and base portion 71b as shown in the first embodiment is provided on one end side of the first arm 70'. A fixed part 61 to be mounted to the hub members 20, 30 is provided on the other end side of the first arm 70'.

The first arm 70' further has a base-end-side part 73 that extends from the fixed part 61 mainly in the axial direction of the corresponding small-diameter roller 40, a large-diameter-roller support part 74 that supports the large-diameter roller 50, and a connecting part 75 that connects the large-diameter-roller support part 74 and the small-diameter-roller support part 71 to each other.

A small-diameter-roller bolt B1 is screwed into the hole 71a provided in the small-diameter-roller support part 71, and the large-diameter-roller support part 74 is provided with a hole 74a through which a large-diameter-roller bolt B2 passes.

In this embodiment, a plane including a centerline of the hole 71a and a centerline of the hole 74a passes through the center of the first arm 70' in a predetermined direction along the rotational axis RL. The fixed part 61 is disposed at a center position relative to that center. The center of the base-end-side part 73 in the width direction may constitute the center of the first arm 70' in the predetermined direction along the rotational axis RL.

A distal end portion of the base-end-side part 73 bends mainly in a direction along the rotational axis RL2 of the corresponding large-diameter roller 50, and the large-diameter-roller support part 74 is provided at a distal end of the base-end-side part 73. In this embodiment, the large-diameter-roller support part 74 has a base portion 74b that extends from the distal end of the base-end-side part 73 toward the outer side in the radial direction of the hub members 20, 30, and a cylindrical portion 74c that extends from the base portion 74b or near the base portion 74b in a direction along the rotational axis RL2 of the corresponding large-diameter roller 50. The cylindrical portion 74c protrudes from the base portion 74b in a direction away from the fixed part 61. In this embodiment, the radial direction of the hub members 20, 30 and the radial direction of the omnidirectional wheel 1 coincide with each other.

The inside diameter of the cylindrical portion 74c is slightly larger than the outside diameter of the other end side in the axial direction of the shaft 53 of the large-diameter roller 50. Or the inside diameter of the cylindrical portion 74c is equal to the outside diameter of the other end side in the axial direction of the shaft 53.

When the other end side in the axial direction of the shaft 53 of the corresponding large-diameter roller 50 is inserted into the cylindrical portion 74c, a distal end surface of the cylindrical portion 74c is pressed against the inner ring of the bearing 54, and thereby the inner ring of the bearing 54 is pressed against the step on the other end side of the shaft 53 of the corresponding large-diameter roller 50.

In some cases, the large-diameter-roller support part 74 does not have the cylindrical portion 74c. In this case, the base portion 74b is provided with a counterbore and the end portion of the shaft 53 is fitted into this counterbore. In some cases, the large-diameter-roller support part 74 has other structure that can support the other end side of the corresponding large-diameter roller 50.

In the second embodiment, the small-diameter-roller support part 71 has a base portion 71b that extends toward the outer side in the radial direction of the hub members 20, 30, and a semicylindrical portion 71d that extends from the base portion 71b or near the base portion 71b in a direction along the rotational axis RL1 of the corresponding small-diameter roller 40. The semicylindrical portion 71d protrudes from the base portion 71b in a direction toward the fixed part 61. In the second embodiment, the semicylindrical portion 71d is provided instead of the cylindrical portion 71c of the first embodiment.

The inside diameter of the semicylindrical portion 71d is slightly larger than the outside diameter of one end side in the axial direction of the shaft 43 of the small-diameter roller 40. Or the inside diameter of the semicylindrical portion 71d is equal to the outside diameter of the one end side in the axial direction of the shaft 43.

When one end side in the axial direction of the shaft 43 of the corresponding small-diameter roller 40 is inserted into the semicylindrical portion 71d, a distal end surface of the semicylindrical portion 71d is pressed against an inner ring of the bearing 44, and thereby the inner ring of the bearing 44 is pressed against the step on one end side of the shaft 43 of the corresponding small-diameter roller 40.

In some cases, the small-diameter-roller support part 71 does not have the semicylindrical portion 71d. In this case, the base portion 71b is provided with a counterbore and the end portion of the shaft 43 is fitted into this counterbore. In some cases, the small-diameter roller support part 71 has other structure that can support the other end side of the corresponding small-diameter roller 40.

The connecting part 75 connects the large-diameter-roller support part 74 and the small-diameter-roller support part 71 to each other. In this embodiment, the connecting part 75 connects the base portion 74b of the large-diameter-roller support part 74 and the base portion 71b of the small-diameter-roller support part 71 to each other. The connecting part 75 may connect another portion of the large-diameter-roller support part 74 and another portion of the small-diameter-roller support part 71 to each other.

The connecting part 75 extends mainly in the direction of the rotational axis RL2 of the corresponding large-diameter roller 50 when seen from the extension direction of the rotational axis RL, i.e., when the first arm 70' is seen as shown in FIG. 17. The definition of the extension direction of the connecting part 75 is the same as shown in the first embodiment.

The connecting part 75 can be said to extend mainly in the direction of the rotational axis RL2 when the angle formed by the extension direction of the connecting part 75 and the direction of the rotational axis RL2 as seen from the extension direction of the rotational axis RL is not larger than 30°. Preferably, the connecting part 75 can be said to extend mainly in the direction of the rotational axis RL2 when the angle formed by the extension direction of the connecting part 75 and the direction of the rotational axis RL2 is not larger than 20°. More preferably, the connecting part 75 can be said to extend mainly in the direction of the rotational axis RL2 when the angle formed by the extension direction of the connecting part 75 and the direction of the rotational axis RL2 is not larger than 15°.

As shown in FIG. 17, a small-diameter-roller support part 81 that supports one end side of the corresponding small-diameter roller 40 is provided on one end side of the second arm 80', and the fixed part 61 that is shared by the first arm 70' and the second arm 80' is provided on the other end side of the second arm 80'.

The second arm 80' further has a base-end-side part 83 that extends from the fixed part 61 mainly in the axial direction of the corresponding small-diameter roller 40, a large-diameter-roller support part 84 that supports the large-diameter roller 50, and a connecting part 85 that connects the large-diameter-roller support part 84 and the small-diameter-roller support part 81 to each other.

The small-diameter-roller support part 81 is provided with a hole 81a through which the small-diameter-roller bolt B1, which is described later, passes, and the large-diameter-roller support part 84 is provided with a hole 84a into which the large-diameter-roller bolt B2, which is described later, is screwed. When the hole 84a is not an internally threaded hole, a nut is provided near the hole 84a. When the nut is made of a material having higher strength than aluminum, such as iron, the large-diameter roller 50 can be securely fixed by the large-diameter-roller bolt B2. The nut may be fitted into a hole provided in the second arm 80'.

In this embodiment, a plane including a centerline of the hole 81a and a centerline of the hole 84a passes through the center of the second arm 80' in a predetermined direction along the rotational axis RL. The fixed part 61 is disposed at a center position relative to that center. The center of the base-end-side part 83 in the width direction may constitute the center of the second arm 80' in the predetermined direction along the rotational axis RL.

A distal end portion of the base-end-side part 83 bends mainly in a direction along the rotational axis RL2 of the corresponding large-diameter roller 50, and the large-diameter-roller support part 84 is provided at a distal end of the base-end-side part 83. In this embodiment, the large-diameter-roller support part 84 has a base portion 84b that extends from the distal end of the base-end-side part 83 toward the outer side in the radial direction of the hub members 20, 30, and a cylindrical portion 84c that extends from the base portion 84b or near the base portion 84b in a direction along the rotational axis RL2 of the corresponding large-diameter roller 50. The cylindrical portion 84c protrudes from the base portion 84b in a direction away from the fixed part 61.

The inside diameter of the cylindrical portion 84c is slightly larger than the outside diameter of one end side in the axial direction of the shaft 53 of the large-diameter roller 50. Or the inside diameter of the cylindrical portion 84c is equal to the outside diameter of one end side in the axial direction of the shaft 53.

When one end side in the axial direction of the shaft 53 of the corresponding large-diameter roller 50 is inserted into the cylindrical portion 84c, a distal end surface of the cylindrical portion 84c is pressed against the inner ring of the bearing 54, and thereby the inner ring of the bearing 54 is pressed against the step on one end side of the shaft 53 of the corresponding large-diameter roller 50.

In some cases, the large-diameter-roller support part 84 does not have the cylindrical portion 84c. In this case, the base portion 84b is provided with a counterbore and the end portion of the shaft 53 is fitted into this counterbore. In some cases, the large-diameter-roller support part 84 has other structure that can support the other end side of the corresponding large-diameter roller 50.

In the second embodiment, the small-diameter-roller support part 81 has a base portion 81b that extends toward the outer side in the radial direction of the hub members 20, 30, and a semicylindrical portion 81d that extends from the base portion 81b or near the base portion 81b in a direction along the rotational axis RL1 of the corresponding small-diameter roller 40. The semicylindrical portion 81d protrudes from the base portion 81*b* in a direction toward the fixed part 61. In the second embodiment, the semicylindrical portion 81*d* is provided instead of the cylindrical portion 81*c* of the first embodiment.

The inside diameter of the semicylindrical portion 81*d* is slightly larger than the outside diameter of the other end side in the axial direction of the shaft 43 of the small-diameter roller 40. Or the inside diameter of the semicylindrical portion 81*d* is equal to the outside diameter of the other end side in the axial direction of the shaft 43.

When the other end side in the axial direction of the shaft 43 of the corresponding small-diameter roller 40 is inserted into the semicylindrical portion 81*d*, a distal end surface of the semicylindrical portion 81*d* is pressed against the inner ring of the bearing 44, and thereby the inner ring of the bearing 44 is pressed against the step on the other end side of the shaft 43 of the corresponding small-diameter roller 40.

In some cases, the small-diameter-roller support part 81 does not have the semicylindrical portion 81*d*.

The connecting part 85 connects the large-diameter-roller support part 84 and the small-diameter-roller support part 81 to each other. In this embodiment, the connecting part 85 connects the base portion 84*b* of the large-diameter-roller support part 84 and the base portion 81*b* of the small-diameter-roller support part 81 to each other. The connecting part 85 may connect another portion of the large-diameter-roller support part 84 and another portion of the small-diameter-roller support part 81 to each other.

The connecting part 85 extends mainly in the direction of the rotational axis RL2 of the corresponding large-diameter roller 50 when seen from the extension direction of the rotational axis RL, i.e., when the second arm 80' is seen as shown in FIG. 17. The definition of the extension direction of the connecting part 85 is the same as the definition of the extension direction of the connecting part 75 of the first arm 70'.

Also in the second embodiment, when seen from the extension direction of the rotational axis RL, the connecting part 75 connecting the small-diameter-roller support part 71 and the large-diameter-roller support part 74 to each other in the first arm 70' extends mainly in the direction of the rotational axis RL2 of the corresponding large-diameter roller 50. This configuration makes it more likely that a force applied to the small-diameter roller 40 or the large-diameter roller 50 is further transmitted to the plurality of adjacent small-diameter rollers 40 and large-diameter rollers 50. Further, this configuration is advantageous for reducing the thickness of the connecting part 75. In this embodiment, the connecting part 85 of the second arm 80' has the same structure and produces the same effects.

Figure 18:
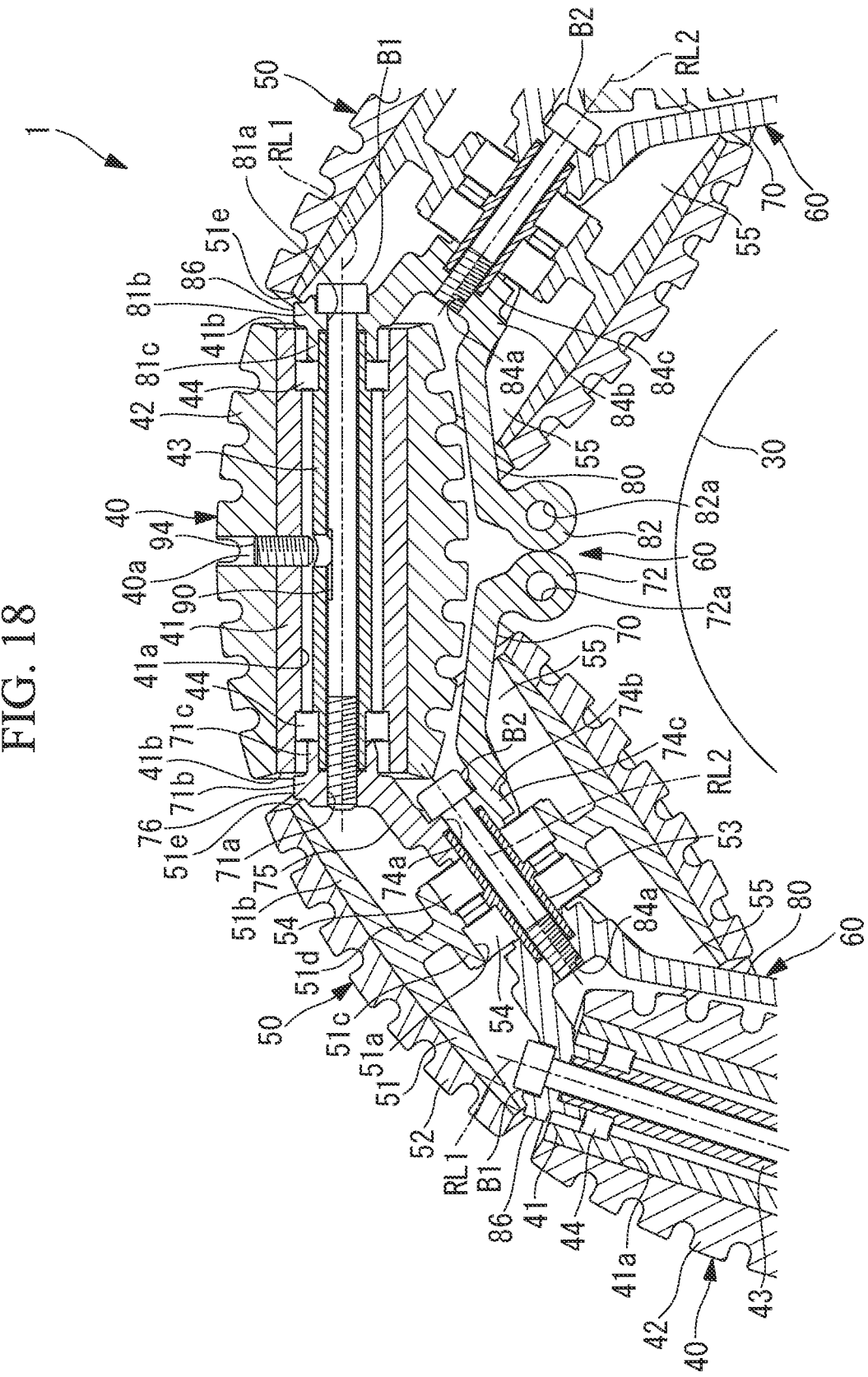
FIG. 18 is a sectional view showing a first modified example of the embodiment.

In the first embodiment, as shown in FIG. 18, the first fixed part 72 of the first arm member 70 and the second fixed part 82 of the second arm member 80 need not overlap each other in the direction along the rotational axis RL. In this case, each of the first fixed part 72 and the second fixed part 82 is fixed to the hub members 20, 30 using the bolt B.

Figure 19:
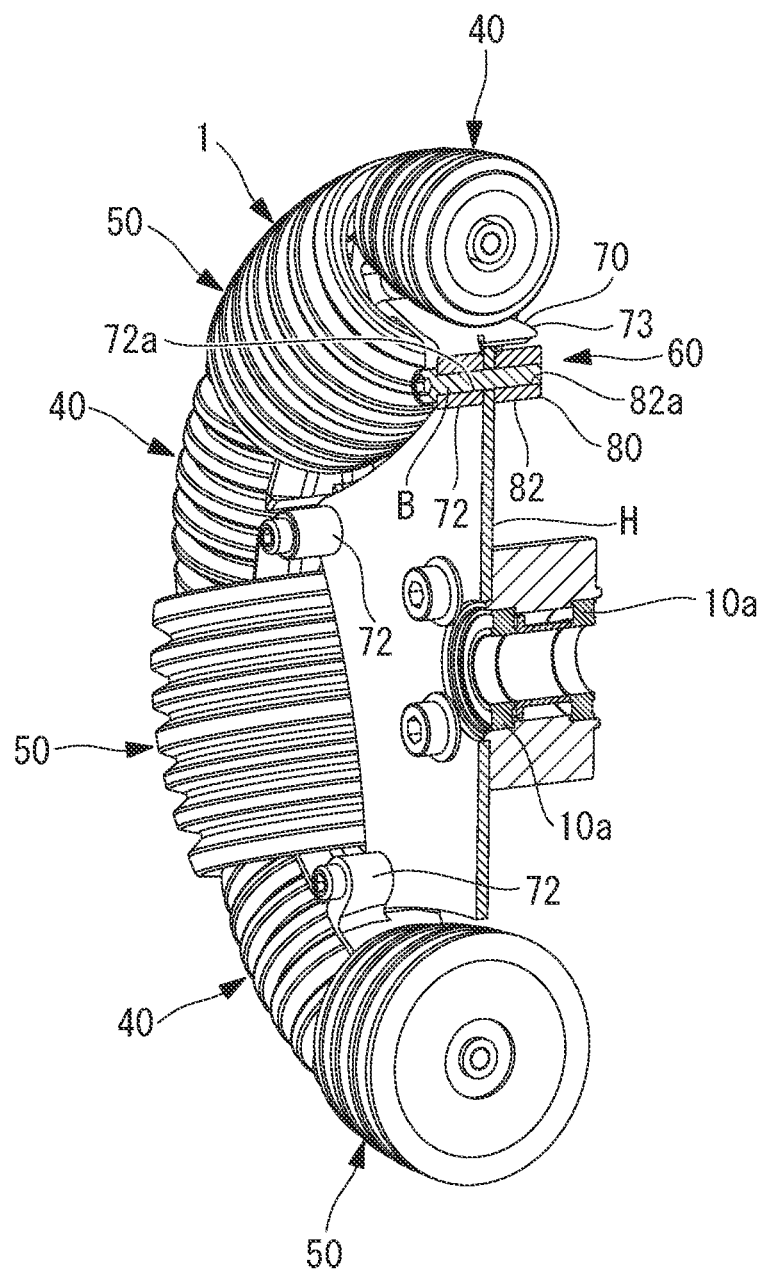
FIG. 19 is a partially sectional perspective view showing a second modified example of the embodiment.

In the first embodiment, as shown in FIG. 19, one hub member H may be used instead of the two hub members 20, 30. In this case, the first fixed part 72 of the first arm member 70 is disposed on one side in a thickness direction of the hub member H, and the second fixed part 82 of the second arm member 80 is disposed on the other side in the thickness direction of the hub member H. The first fixed part 72 and the second fixed part 82 are fixed to the hub member H using the bolt B. Optionally, the first fixed part 72 of the first arm member 70 and the second fixed part 82 of the second arm member 80 may be disposed on one side in the thickness direction of the hub member H. Also in this case, the first fixed part 72 and the second fixed part 82 are fixed to the hub member H by the bolt B.

Figure 20:
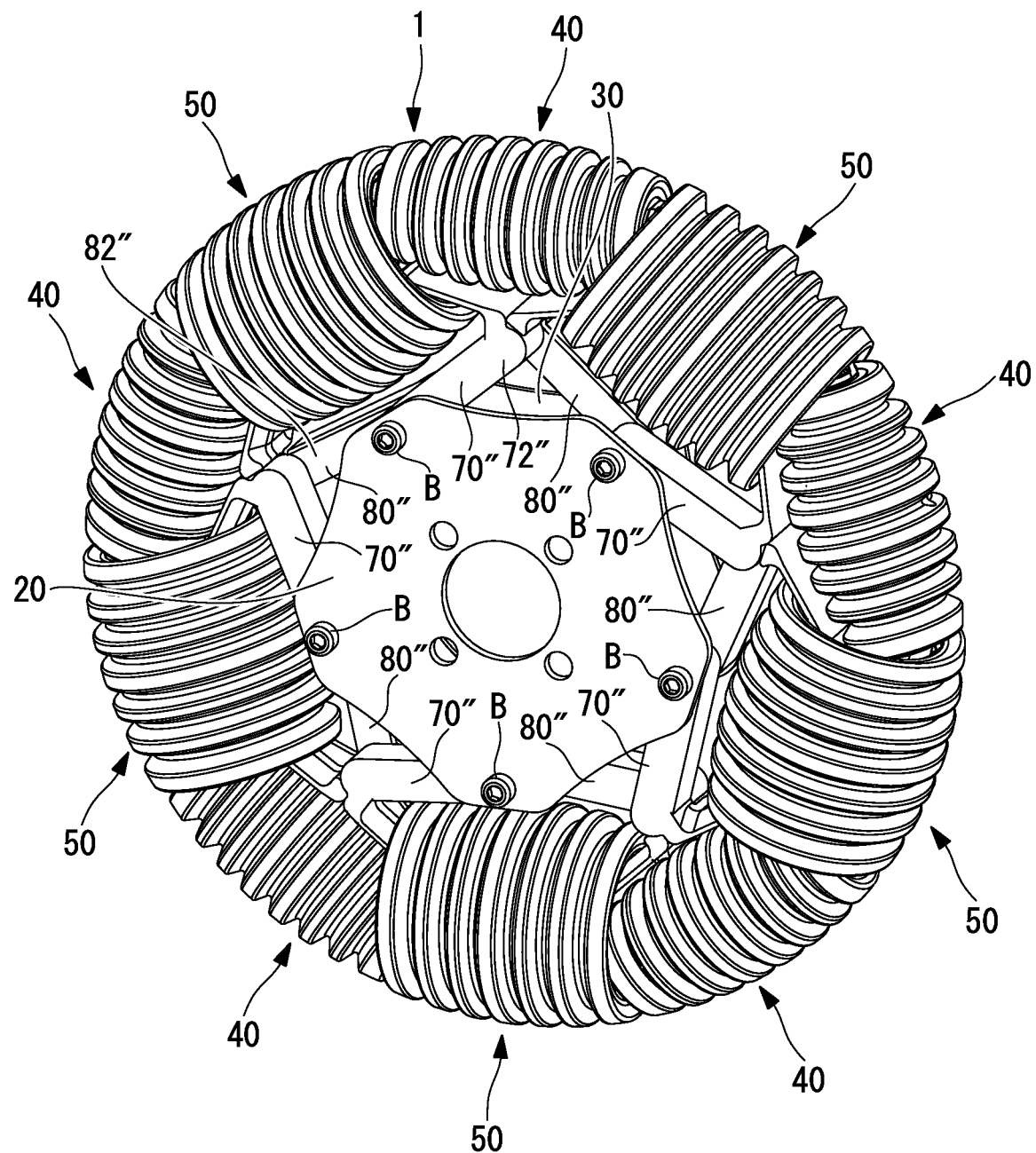
FIG. 20 is a perspective view showing a third modified example of the embodiment.
Figure 21:
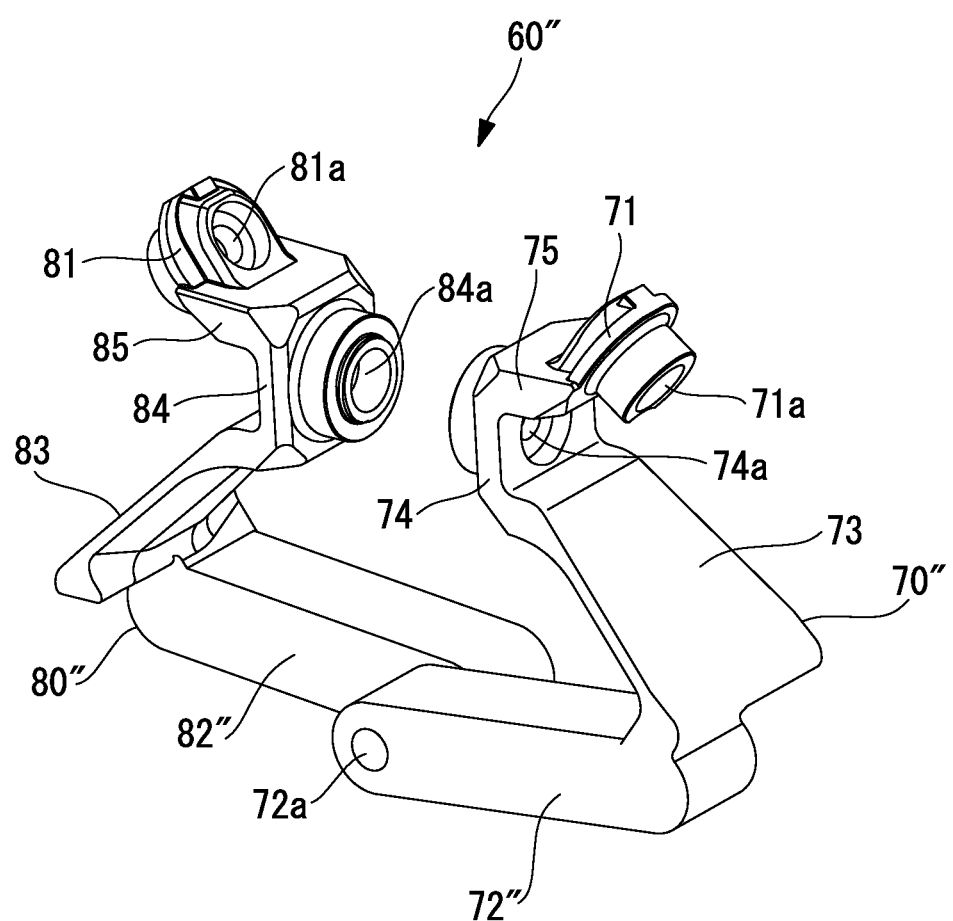
FIG. 21 is a perspective view of a first arm member and a second arm member of the third modified example of the embodiment.

In the first embodiment, the configuration in which each support 60 supports one small-diameter roller 40 has been shown. Instead, as shown in FIG. 20 and FIG. 21, the first arm member 70" and the second arm member 80" can also be configured such that each support 60" supports one large-diameter roller 50. In this case, the first arm member 70" supports one end side in the axial direction of the shaft 53 of the corresponding large-diameter roller 50, and the second arm member 80" supports the other end side in the axial direction of the shaft 53 of the corresponding large-diameter roller 50.

The corresponding small-diameter roller 40 that is corresponding one of the plurality of small-diameter rollers 40 is supported by the first arm member 70" of one of two supports 60" that are adjacent to each other in the circumferential direction and the second arm member 80" of the other one of the two supports 60". For example, the first arm member 70" supports one end side in the axial direction of the shaft 43 of the corresponding small-diameter roller 40, and the second arm member 80" supports the other end side in the axial direction of the shaft 43 of the corresponding small-diameter roller 40.

As shown in FIG. 21, in this modified example, the first fixed part 72" on the other end side of the first arm member 70" is long, but the configuration of the first arm member 70" is otherwise the same as shown in the first embodiment. Specifically, the first fixed part 72" is provided with the hole 72*a*; the base-end-side part 73 extends from the first fixed part 72" in the axial direction of the small-diameter roller 40; the large-diameter-roller support part 74 is provided at the distal end of the base-end-side part 73; the small-diameter-roller support part 71 is provided on one end side of the first arm member 70"; and the connecting part 75 that connects the large-diameter-roller support part 74 and the small-diameter-roller support part 71 to each other is formed. In the same manner as shown in the first embodiment, the connecting part 75 extends mainly in the direction of the rotational axis RL2 of the corresponding large-diameter roller 50 when seen from the extension direction of the rotational axis RL.

Further, the second fixed part 82" on the other end side of the second arm member 80" is long, but the configuration of the second arm member 80" is otherwise the same as shown in the first embodiment. Specifically, the second fixed part 82" is provided with the hole 82*a*; the base-end-side part 83 extends from the second fixed part 82" in the axial direction of the small-diameter roller 40; the large-diameter-roller support part 84 is provided at the distal end of the base-end-side part 83; the small-diameter-roller support part 81 is provided on one end side of the second arm member 80"; and the connecting part 85 that connects the large-diameter-roller support part 84 and the small-diameter-roller support part 81 to each other is formed. In the same manner as shown in the first embodiment, the connecting part 85 extends mainly in the direction of the rotational axis RL2 of the corresponding large-diameter roller 50 when seen from the extension direction of the rotational axis RL.

Moreover, as shown in the first embodiment, the small-diameter-roller support part 71 is provided with the hole 71*a* into which the small-diameter-roller bolt B1 is screwed, and the large-diameter-roller support part 74 is provided with the hole 74*a* through which the large-diameter-roller bolt B2 passes. As shown in the first embodiment, the small-diameter-roller support part 81 is provided with the hole 81*a* through which the small-diameter-roller bolt B1 passes, and the large-diameter-roller support part 84 is provided with the hole 84a into which the large-diameter-roller bolt B2 is screwed.

In the case of this modified example, the large-diameter roller 50 is supported by the support 60" as the first roller, and the small-diameter roller 40 is supported by the support 60" as the second roller.

Also in the case of this modified example, the large-diameter roller 50 is supported not by a single member but by the first arm member 70" and the second arm member 80". The small-diameter roller 40 is supported at one end side by the second arm member 80" and at the other end side by the first arm member 70".

Thus, compared with when the small-diameter roller 40 and the large-diameter roller 50 are supported by a single member, it is more likely that a force applied to the small-diameter roller 40 upon contact with a road surface is transmitted to the adjacent large-diameter rollers 50, and that a force applied to the large-diameter roller 50 is transmitted to the adjacent small-diameter rollers 40. In addition, this modified example can produce the other effects of the first embodiment.

In the first embodiment, as shown in FIG. 1 and FIG. 13, one part 76 of one end of the first arm member 70 is disposed between an end surface 41b in the axial direction of the core member 41 of the small-diameter roller 40 and an end surface 51e in the axial direction of the outer circumference part 51b of the core member 51 of the large-diameter roller 50.

On a floor surface of an office, an indoor hallway, an indoor passage, or the like, cables, such as power cables and LAN cables, and similar linear objects may be present. In particular, such cables and linear objects are present under a desk etc.

The electric mobility vehicle 100 as shown in FIG. 5 is highly likely to travel on a floor surface on which cables and linear bodies are present as described above. In particular, if the driver, while working at a desk, moves the omnidirectional wheels 1 that are either front wheels or rear wheels, the omnidirectional wheels 1 may tread on a cable or a linear object.

Here, since the one part 76 of the first arm member 70 is disposed between the end surface 41b of the core member 41 of the small-diameter roller 40 and the end surface 51e of the core member 51 of the large-diameter roller 50, it is less likely that a cable or a linear object gets caught between the small-diameter roller 40 and the large-diameter roller 50. When a cable or a linear body gets caught, it twines around the small-diameter roller 40 or the large-diameter roller 50. The above configuration is useful for preventing or reducing such a trouble.

As shown in FIG. 13, one part 86 of one end of the second arm member 80 is also disposed between the end surface 41b of the core member 41 of the small-diameter roller 40 and the end surface 51e of the outer circumference part 51b of the core member 51 of the large-diameter roller 50.

Figure 22:
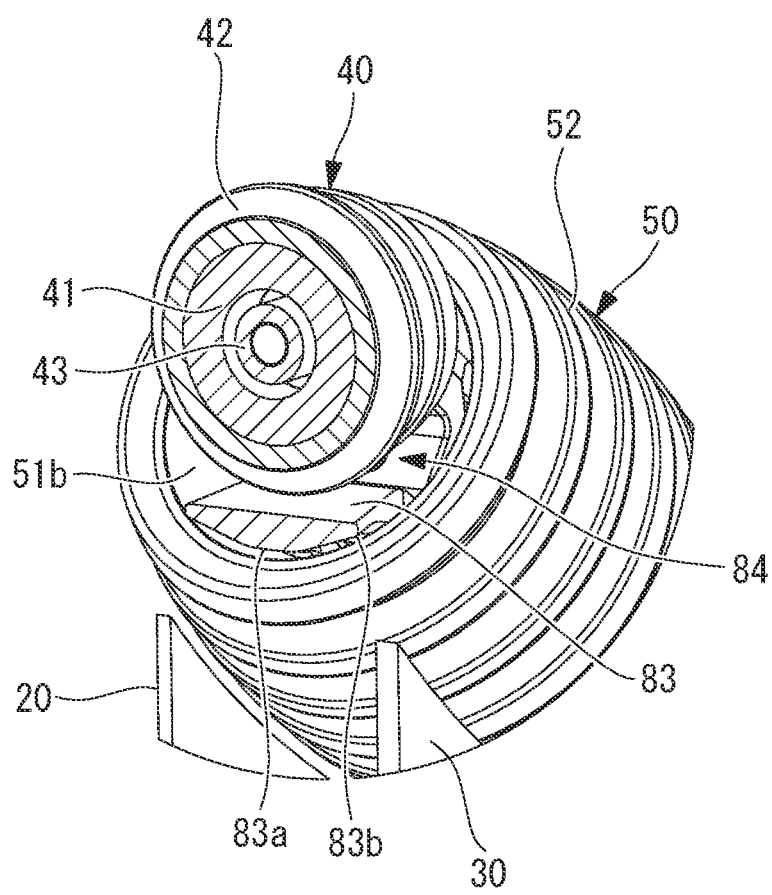
FIG. 22 is a sectional view taken along line XXII-XXII in FIG. 1.

In each of the above embodiments, as shown in FIG. 22, a center portion 83a in the wheel width direction of an inner surface in the wheel radial direction of the base-end-side part 83 of the second arm member 80 bulges toward the inner side in the wheel radial direction. In this embodiment, the wheel radial direction and the radial direction of the hub members 20, 30 coincide with each other. In this embodiment, the entire inner surface bulges toward the inner side in the wheel radial direction. Further, in this embodiment, as shown in FIG. 9, the center portion 83a bulges as described above along the entire base-end-side part 83 in its length direction.

A part of the inner surface faces the inner circumference surface of the outer circumference part 51b of the large-diameter roller 50. In the inner surface, the distance between the center portion 83a in the wheel width direction and the inner circumference surface of the outer circumference part 51b of the large-diameter roller 50 and the distance between an end portion 83b in the wheel width direction and the inner circumference surface of the outer circumference part 51b is not longer than 1 mm. A center portion 73a of the base-end-side part 73 of the first arm member 70 also bulges in the same manner as the center portion 83a of the base-end-side part 83 of the second arm member 80, and the distance between the inner surface of the base-end-side part 73 and the inner circumference surface of the outer circumference part 51b of the large-diameter roller 50 is also the same.

Thus, even if the base-end-side part 73 or 83 breaks at the position of the section shown in FIG. 22 or at a position closer to the large-diameter-roller support part 74 or 84, the inner circumference surface of the outer circumference part 51b of the large-diameter roller 50 contacts the inner surface of the base-end-side part 73 or 83, so that the large-diameter roller 50 is restrained from moving in the wheel radial direction and moving in the wheel circumferential direction relative to the first arm member 70 and the second arm member 80. For example, even after the base-end-side parts 73, 83 break under an unexpected load, the surfaces resulting from the breakage face each other. The large-diameter roller 50 is thereby restrained from moving in the wheel circumferential direction relative to the first arm member 70 and the second arm member 80. While this effect can be expected when the distance between the center portion 83a in the wheel width direction and the inner circumference surface of the outer circumference part 51b of the large-diameter roller 50 is not longer than 2 mm, the distance is preferably not longer than 1.5 mm.

Portions of the base-end-side part 73, 83 on the side of the large-diameter-roller support parts 74, 84 are disposed inside the recesses 55 of the large-diameter rollers 50. Thus, the large-diameter rollers 50 get caught on the base-end-side parts 73, 83, so that the large-diameter rollers 50 are prevented from coming off the omnidirectional wheel. In this case, even when the base-end-side parts 73, 83 break under an unexpected load, travel by the omnidirectional wheel is possible.

That portions of the large-diameter rollers 50 are disposed between the hub members 20, 30 as shown in this embodiment also contributes to preventing the large-diameter rollers 50 from coming off the omnidirectional wheel.

Portions of the base-end-side parts 73, 83 on the side of the large-diameter-roller support parts 74, 84 are disposed inside the recesses 55 of the large-diameter rollers 50, and the weakest portions of the base-end-side parts 73, 83 are disposed inside the recesses 55. In this embodiment, the weakest portion is a portion with the smallest cross-sectional area in the base-end-side part 73 or 83. This configuration is advantageous for preventing the large-diameter rollers 50 from coming off the omnidirectional wheel when the base-end-side parts 73, 83 break under an unexpected load.

REFERENCE SIGNS LIST

1 Omnidirectional wheel
10 Axle
20, 30 Hub member (rotating part)

40 Small-diameter roller (first roller)
40a Hole
41 Core member
43 Shaft
50 Large-diameter roller (second roller)
50b Plug member
51 Core member
53 Shaft
60, 60', 60" Support
61 Fixed part
70, 70', 70" First arm member, first arm
71 Small-diameter-roller support part
72, 72" First fixed part
73 Base-end-side part
73a Center portion
73b End portion
74 Large-diameter-roller support part
75 Connecting part
80, 80', 80" Second arm member, second arm
81 Small-diameter-roller support part
82, 82" Second fixed part
83 Base-end-side part
83a Center portion
83b End portion
84 Large-diameter-roller support part
85 Connecting part
90 Chamfered portion (engaging portion)
91 First flat surface part
92 Second flat surface part
93 Curved surface part
94 Screw member
95 Plug member
96 Hole
97 Fixing member
RL, RL1, RL2 Rotational axis

The invention claimed is:

1. An omnidirectional wheel whose outer circumference surface is formed with a plurality of rollers and which rotates around a rotation axis of an axle, the omnidirectional wheel comprising:
  a rotating part that rotates around the rotational axis of the axle; and
  a plurality of supports which is arranged in a circumferential direction of the rotating part and each of which is mounted on the rotating part to support the plurality of rollers on the rotating part, wherein
  the plurality of rollers includes a plurality of first rollers and a plurality of second rollers having a different outside diameter from the first rollers,
  the first rollers and the second rollers alternate with each other in the circumferential direction,
  each of the supports has a first arm member that supports one end side in an axial direction of a corresponding first roller that is a corresponding one of the plurality of first rollers, and a second arm member that supports the other end side in the axial direction of the corresponding first roller,
  a corresponding second roller that is a corresponding one of the plurality of second rollers is supported by the first arm member of one of two supports that are adjacent to each other in the circumferential direction and the second arm member of the other one of the two supports,
  one end side in the axial direction of the corresponding first roller is supported by one end side of the first arm member, and the other end side of the first arm member is mounted on the rotating part, and
  the other end side in the axial direction of the corresponding first roller is supported by one end side of the second arm member, and the other end side of the second arm member is mounted on the rotating part.

2. The omnidirectional wheel according to claim 1, wherein one end side in the axial direction and the other end side in the axial direction of the corresponding first roller are fixed to the first arm member and the second arm member by one fixing member that extends in the axial direction of the corresponding first roller.

3. The omnidirectional wheel according to claim 1, wherein the corresponding second roller is fixed to the first arm member and the second arm member by one fixing member that extends in the axial direction of the corresponding second roller.

4. The omnidirectional wheel according to claim 1, wherein the first roller is a small-diameter roller and the second roller is a large-diameter roller having a larger outside diameter than the first roller.

5. The omnidirectional wheel according to claim 4, wherein
  in the first arm member, a large-diameter-roller support part that supports the corresponding second roller is disposed on an inner side in a radial direction of the rotating part relative to a small-diameter-roller support part that supports one end side in the axial direction of the first roller,
  the first arm member has a connecting part that connects the large-diameter-roller support part and the small-diameter-roller support part to each other, and
  when seen from an extension direction of the rotation axis of the axle, the connecting part extends in a direction of a rotational axis of the corresponding second roller.

6. The omnidirectional wheel according to claim 5, wherein
  in the second arm member, a large-diameter-roller support part that supports the corresponding second roller is disposed on the inner side in the radial direction relative to a small-diameter-roller support part that supports the other end side in the axial direction of the first roller,
  the second arm member has a connecting part that connects the large-diameter-roller support part and the small-diameter-roller support part to each other, and
  when seen from an extension direction of the rotation axis of the axle, the connecting part of the second arm member extends in a direction of the rotational axis of the corresponding second roller.

7. The omnidirectional wheel according to claim 5, wherein an extension direction of the connecting part of the first arm member and a direction of the rotational axis of the corresponding second roller form an angle not larger than 20°.

8. The omnidirectional wheel according to claim 1, wherein the other end side of the first arm member and the other end side of the second arm member overlap each other in a predetermined direction along the rotation axis of the axle.

9. The omnidirectional wheel according to claim 8, wherein
  a first fixed part that is fixed to the rotating part is formed on the other end side of the first arm member,
  a second fixed part that is fixed to the rotating part is formed on the other end side of the second arm member, the first fixed part is formed at a position offset toward one side in the predetermined direction relative to the center of the first arm member in a direction along the rotation axis of the axle; and the second fixed part is formed at a position offset toward the other side in the predetermined direction relative to the center of the second arm member in a direction along the rotation axis of the axle.

10. An omnidirectional wheel whose outer circumference surface is formed with a plurality of rollers and which rotates around a rotation axis of an axle, the omnidirectional wheel comprising:

a rotating part that rotates around the rotational axis of the axle; and a plurality of supports which is arranged in a circumferential direction of the rotating part and each of which is mounted on the rotating part to support the plurality of rollers on the rotating part, wherein the plurality of rollers includes a plurality of first rollers and a plurality of second rollers having a different outside diameter from the first rollers, the first rollers and the second rollers alternate with each other in the circumferential direction, each of the supports has a first arm member that supports one end side in an axial direction of a corresponding first roller that is a corresponding one of the plurality of first rollers, and a second arm member that supports the other end side in the axial direction of the corresponding first roller, and a corresponding second roller that is a corresponding one of the plurality of second rollers is supported by the first arm member of one of two supports that are adjacent to each other in the circumferential direction and the second arm member of the other one of the two supports, wherein at least one roller of the plurality of rollers has a hole that extends from an outer circumference surface of the roller to an inner circumference surface of the roller.

11. The omnidirectional wheel according to claim 10, wherein the hole is closed by a plug member that closes the hole.

12. The omnidirectional wheel according to claim 10, wherein, the at least one roller is the corresponding first roller, one end side in the axial direction and the other end side in the axial direction of the corresponding first roller are mounted on the support by one bolt that extends in the axial direction of the corresponding first roller, and an outer circumference surface of the bolt has an engaging portion formed at an axial position corresponding to the hole.

13. The omnidirectional wheel according to claim 12, wherein, at the engaging portion, the outer circumference surface of the bolt has a first planar surface part, a second planar surface part located at a different position from the first planar surface part in a circumferential direction of the outer circumference surface of the bolt, and a curved surface part connecting the first planar surface part and the second planar surface part to each other.

14. The omnidirectional wheel according to claim 10, wherein the at least one roller is the corresponding first roller, one end side in the axial direction and the other end side in the axial direction of the corresponding first roller are mounted on the support by one bolt that extends in the axial direction of the corresponding first roller, the hole is one in which a screw member can be engaged, and the bolt has, at an axial position corresponding to the hole, an engaging portion that engages with the screw member.

15. The omnidirectional wheel according to claim 4, wherein a part of one end side in the axial direction of the corresponding first roller is disposed inside a recess that is formed at an end in the axial direction of the corresponding second roller.

16. An omnidirectional wheel whose outer circumference surface is formed with a plurality of rollers and which rotates around a rotation axis of the axle, the omnidirectional wheel comprising:

a rotating part that rotates around the rotation axis of the axle; and a plurality of supports which is arranged in a circumferential direction of the rotating part and each of which is mounted on the rotating part to support the plurality of rollers on the rotating part, wherein the plurality of rollers includes a plurality of small-diameter rollers and a plurality of large-diameter rollers having a larger outside diameter than the small-diameter rollers, the small-diameter rollers and the large-diameter rollers alternate with each other in the circumferential direction, each of the supports has a first arm that supports one end side in an axial direction of a corresponding small-diameter roller that is a corresponding one of the plurality of small-diameter rollers, and a second arm that supports the other end side in the axial direction of the corresponding small-diameter roller, a corresponding large-diameter roller that is a corresponding one of the plurality of large-diameter rollers is supported by the first arm of one of two supports that are adjacent to each other in the circumferential direction and the second arm of the other one of the two supports, in the first arm, a large-diameter-roller support part that supports the corresponding large-diameter roller is disposed on an inner side in a radial direction of the rotating part relative to a small-diameter-roller support part that supports one end side in the axial direction of the corresponding small-diameter roller, the first arm has a base-end-side part that extends in the axial direction of the corresponding small-diameter roller, the base-end-side part connects a fixed part to be fixed to the rotating part and the large-diameter-roller support part to each other, a part of an inner surface of the base-end-side part in the radial direction and an inner circumference surface of the corresponding large-diameter roller face each other, a center portion, in a wheel width direction, of the part of the inner surface bulges toward the inner side in the radial direction, and a distance between the part of the inner surface and the inner circumference surface of the corresponding large-diameter roller is not larger than 2 mm.

17. The omnidirectional wheel according to claim 16, wherein a portion of the base-end-side part is disposed inside a recess formed at an end portion of the corresponding large-diameter roller, the portion being located at a side of the large-diameter-roller support part in the base-end-side part and a weakest portion of the base-end-side part is disposed inside the recess.

\* \* \* \* \*